United States Patent [19]

Nathanson et al.

[11] Patent Number: 4,894,114

[45] Date of Patent: Jan. 16, 1990

[54] PROCESS FOR PRODUCING VIAS IN SEMICONDUCTOR

[75] Inventors: Harvey C. Nathanson, Pittsburgh; Michael C. Driver, McKeesport; Michael W. Cresswell, Plum Borough, all of Pa.; Ronald G. Freitag, Baltimore, Md.; Donald K. Alexander; Daniel F. Yaw, both of Ellicott City, Md.

[73] Assignee: Westinghouse Electric Corp., Pittsburgh, Pa.

[21] Appl. No.: 292,973

[22] Filed: Jan. 3, 1989

Related U.S. Application Data

[62] Division of Ser. No. 13,490, Feb. 11, 1987, Pat. No. 4,823,136.

[51] Int. Cl.[4] .................. H01L 21/306; B44C 1/22; C03C 15/00; C03C 25/06
[52] U.S. Cl. ............................ 156/631; 156/633; 156/644; 156/652; 156/659.1; 156/662; 204/192.17; 357/41; 357/81; 437/203; 437/209; 437/902
[58] Field of Search ............... 156/630, 631, 633, 644, 156/650, 643, 651, 652, 656, 659.1, 661.1, 662; 204/192.15, 192.17, 192.3, 192.32, 192.36; 427/97; 437/40, 51, 56, 59, 189, 203, 209, 228, 246, 902; 357/41, 51, 55, 71, 80, 81

[56] References Cited

U.S. PATENT DOCUMENTS 3,343,256  9/1967  Smith et al. ............... 437/203 X
4,339,870  7/1982  Ball et al. ................. 437/51 X
4,426,768  1/1984  Black et al. ............... 437/203
4,559,695  12/1985  Baker ....................... 437/203 X Primary Examiner—William A. Powell
Attorney, Agent, or Firm—G. S. Grunebach

[57] ABSTRACT

An improved phased-array active antenna transmit-receive means utilizing a multiplicity of individual transmit-receive cells positioned in an array format upon a common wafer of semiconductor material. Each transmit-receive cell, comprises a multiplicity of redundant, integrated circuit, electronic devices implanted upon the common semiconductor substrate. The transmit-receive cells utilize novel mitered mechanical switches to permanently interconnect individual electronic devices into either transmit or receive circuits during the fabrication and test of the transmit-receive cells. Radio frequency and direct current input and output vias formed from a novel metal evaporation technique connect the devices upon the surface of the common semiconductor wafer to underlying, insulated direct current distribution circuits and a radio frequency manifold. This array of improved phased-array active antenna transmit-receive means comprised of transmit-receive cells sharing common central processing means, logic control and heat dissipation means results in a significant reduction in the size and weight of the standard phased-array active antenna system. This significant reduction in antenna system size and weight is very important in broad band electronic countermeasure systems or narrow band phased array active antenna radar systems as used in advanced tactical fighters, or space applications.

1 Claim, 29 Drawing Sheets

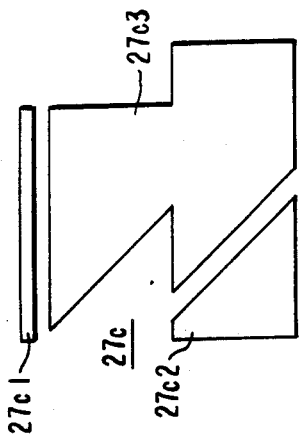
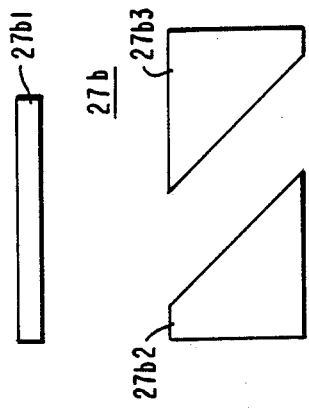
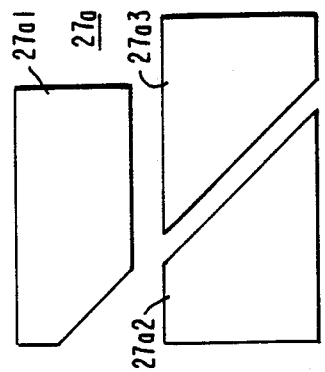
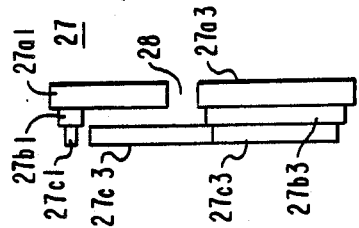
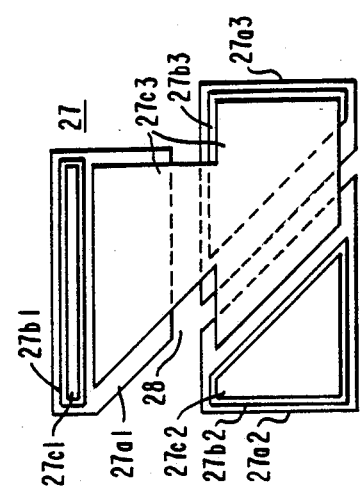

PROCESS FOR PRODUCING VIAS IN SEMICONDUCTOR

This is a division of application Ser. No. 07/013,490 filed February 11, 1987, now Pat. No. 4823136.

BACKGROUND OF THE INVENTION

1. Field of the Invention

The present invention relates to an a small, light weight transmit-receive means for use in a phased-array active antenna system utilizing a multiplicity of individual transmit-receive cells, all mounted upon a common wafer of semiconductor material. Each transmit-receive cell comprises a plurality of redundant electronic devices that are selectively and permanently interconnectable by mitered mechanical switches.

2. Description of the Prior Art

Previous phased array active antenna systems for radar or electronic warfare applications utilized active FETs (field effect transistors), passive capacitors and phase shifting microstrip lines all manufactured on a multiplicity of individual monolithic chips. Each individual chip performed a separate functions such as; attenuation, digital and analog phase shift, power amplification, transmit/receive duplexing, and low-noise amplification. All of the individual chips were then mounted together on a cooled platen in a metallic assembly. This aggregation of individual chips constituted only *one* active element of a phased-array active antenna system. A complete phased-array active antenna system required hundreds of such complex elements all mounted to a common matrix of radio frequency signal carriers.

Today, there are radar and electronic warfare applications, where lightweight active antenna systems are necessary. A prior art assembly of monolithic chips bonded onto a heavy metal matrix of carriers weighed over 600 lbs. (272.73 kgm). When a high speed, advanced tactical aircraft, performs high velocity tactical maneuvers; such a heavy, phased array active antenna radar or electronic warfare system would be subjected to high inertial forces. Only a lightweight, phased array active antenna system would be able to successfully withstand the high velocity turns and extreme gravitational forces developed by an advanced tactical fighter.

A standard phased-array active antenna system comprises; a means to produce a radio frequency signal, a transmit-receive means or duplexer which is operable to transmit or receive radio frequency signals, and a logic device, operable to shape the output beam from an antenna means.

The transmit-receive means or duplexer comprises; an attenuation means, a multistage amplification means, a low-noise amplification means; and appropriate transmit-receive switches which operate as a signal isolation means when the transmit-receive means is in either a transmit or receipt mode. Heat dissipation of heat away from the amplification means of the duplexer requires the use of heat sinks integrated with the duplexer to maintain operational temperatures for the circuits. Direct current, electrical energy is provided from a power generation means to the transmit-receive means devices.

Historically, a variety of systems of decreasing weight and size have been designed to achieve a lightweight antenna phased-array system. The patent to Stockton et al., U.S. Pat. No. 4,490,721 taught a monolithic microwave circuit including an integral array antenna. The Stockton invention included radiating elements, a feed network, phasing network, active and passive semiconductor devices, logic interface, and a microprocessor all incorporated on a gallium arsenide substrate. However, even with the incorporation of these devices on one substrate the Stockton invention perpetuated the individual element approach. Also, the lack of electronic device redundancy resulted in a low yield of operable chips. The reliance on this individual chip approach did not appreciably reduce the weight of the final antenna array with its multiplicity of individual elements. A multiple device or electronic device redundancy concept in the transmit-receive means would produce a high yield transmit-receive means. If a multiplicity of transmit-receive means are mounted onto a common semiconductor wafer a greater yield of operable devices would be the result.

The size of the antenna unit cell is constrained in that it cannot be any larger than 0.6 $\lambda_0$ is the free space wavelength given by this equation:

$$\lambda_{0\ min} = c/f_{HIGHEST},$$

where
$\lambda_0$ = minimum free space wavelength
$c = 3 \times 10^{10}$ cm/sec.
$f$ = highest operating frequency The problem to be solved, then, is the manufacture of an active phased-array antenna system incorporating lightweight, redundant array elements operable for use in broadband radar or electronic warfare devices on advanced tactical fighters.

SUMMARY OF THE INVENTION

In accordance with the above requirements, the present invention, a phased-array active antenna transmit-receive means utilizing arrayed transmit-receive cells all mounted upon a common semiconductor substrate resolves the problem of multiple microelectronic modules and their resultant combined weight. For frequencies equal to 12 GHz, 15 GHz or 18 GHz triple electronic device redundancy can be incorporated into a space of 0.6 $\lambda_0$ or approximately 0.5 in. (1.27 cm).

This transmit-receive means, operable for use in an active antenna phased array system would transmit or receive individually phase shifted radio frequency signals. This transmit-receive means would comprise a single wafer of semiconductor material. This wafer would be planar in configuration having a top and a bottom surface. A plurality of individual transmit-receive cells would be layered upon the top surface of this common wafer utilizing standard photolithographic techniques. These individual transmit-receive cells would comprise a multiplicity of redundant electronic devices. These redundant electronic devices would be selectively, permanently interconnectable to form transmit and receive circuits on the surface of the wafer.

A critical component of these redundant devices would be a mechanical switching means that would be operable to selectively, permanently interconnect the various selected electronic devices. This application teaches a mitered mechanical switch which is operable to selectively interconnect various; attenuation, amplification or phase shifting devices during the transmit-receive means fabrication and test. These mechanical mitered switches are operable to be closed at room temperatures using standard pressure sensitive techniques.

To input and output radio frequency signals onto the transmit-receive means requires a via fabrication technique using metal evaporation to produce stable, solid electrical connections. Further these same vias could be produced to supply direct current to the field effect transistors of the various signal amplification devices on the transmit-receive cell.

The disclosed transmit-receive means therefore comprises an array of individual transmit-receive cells. Each individual transmit-receive cell comprises all of the necessary electronic devices to transmit or receive a radio frequency signal in a physical area of approximately 0.395 inches (1.002 cm). Further, these devices are positioned upon the individual transmit-receive cell in a state of triple redundacy. Mitered mechanical switches, which are closed using pressure or vibration applied at room temperature permits the selection and permanent interconnection of individual operable electronic devices into transmit or receive circuits. Further the individual devices have redundant elements such as field effect transistors which increase the probability of working devices, and operational transmit-receive circuits, thereby increasing transmit-receive cell yield. All of the individual transmit-receive cells are layered upon a single wafer of semiconductor material such as galium arsenide, in an array configuration. Each transmit-receive cell would control the individual output signal emitted from an individual antenna mans or amplify the received signal from that same antenna means. An array of sixteen transmit-receive cells would be approximately 2.08 inches (5.28 cm) in diameter. An antenna system comprising one hundred of such transmit-receive means of sixteen cells each would be approximately 208 inches (528.32 cm) in diameter with an overall weight of approximately 60-80 lbs. (27.27-36.36 kg). Therefore, the use of this novel transmit-receive means would have a ten-fold reduction in weight for the conventional active antenna radar system.

The transmit-receive cells are fully functional at broadband and narrow band radio frequencies. In the narrow band of 9.8 to 10.2 GHz, the active antenna system would operate as a radar system. In the broadband range of 2.0 GHz to 20.0 GHz the active antenna system is fully functional in electronic countermeasures and radio frequency jamming. Either application would find a place on an advanced tactical aircraft or space based configuration because of weight and size restrictions.

BRIEF DESCRIPTION OF THE DRAWINGS

For a better understanding of the invention, reference may be had to the preferred embodiment exemplary of the invention shown in the accompanying drawings in which:

FIG. 9 is a plan view of a mitered mechanical switch in the open position;

FIG. 9A is a plan view of the first layer of metalization of the mitered mechanical switch in FIG. 10;

FIG. 9B is a plan view of the second layer of metalization of the mitered mechanical switch in FIG. 10;

FIG. 9C is a plan view of the third layer of metalization of the mitered mechanical switch in FIG. 10;

FIG. 9D is a side elevational view, left of the mitered mechanical switch of FIG. 10;

FIG. 9E is a side elevational view, right of the mitered mechanical switch of FIG. 10;

DESCRIPTION OF THE PREFERRED EMBODIMENTS

Figure 1:
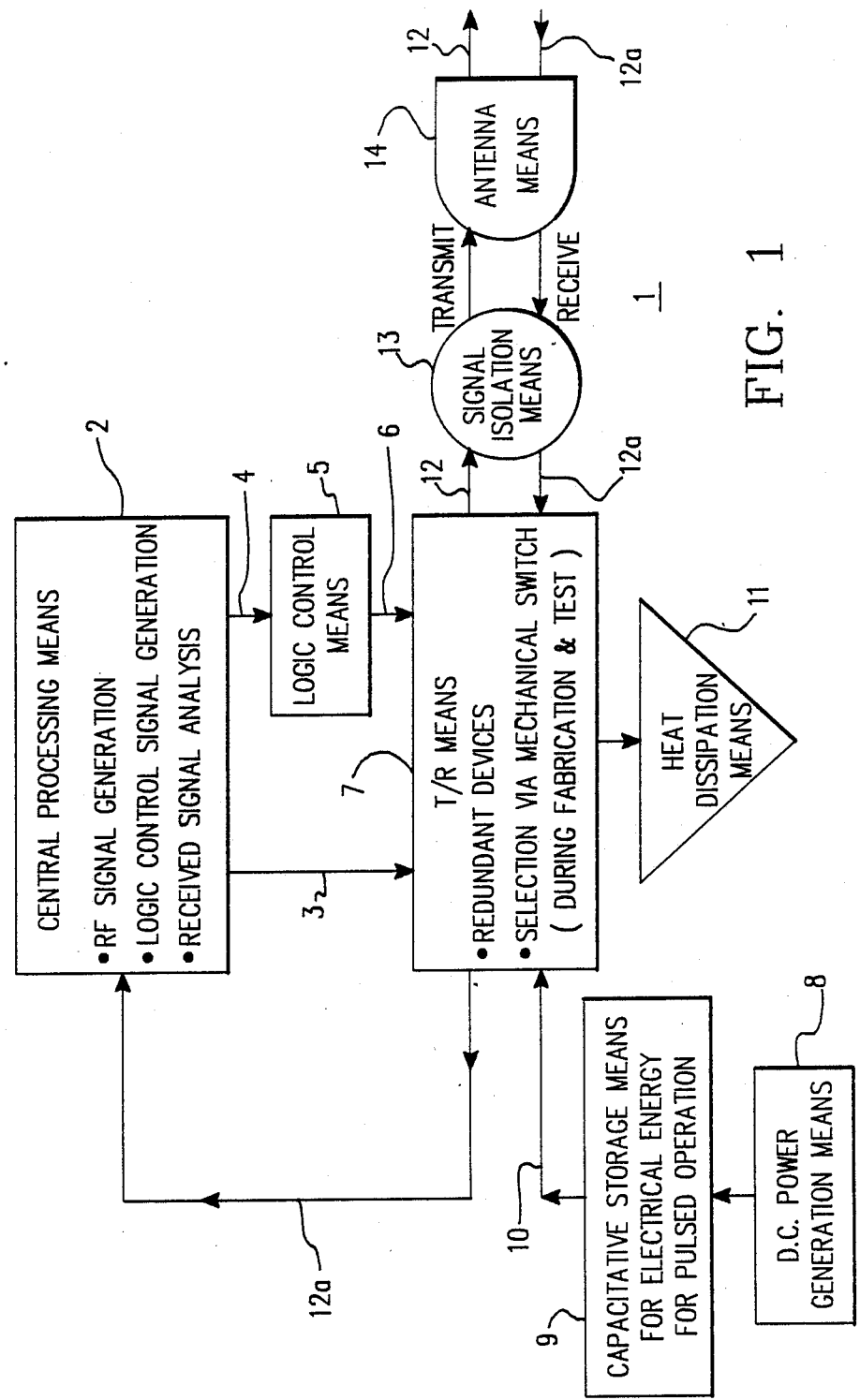
FIG. 1 is a flowchart of the individual means necessary for a phased array active antenna system.

FIG. 1, is a flowchart of the individual means required for an improved phased-array active antenna system utilizing a transmit-receive means comprising; arrayed transmit-receive cells on a single substrate of semiconductor material.

This improved phased array active antenna system 1, comprises a central processing means 2. As shown in FIG. 1, this central processing means 2 is operable to generate an RF input signal 3, into the transmit-receive means 6. The central processing means 2, also generates coded signal 4 to a logic control means 5. The logic control means 5, decodes signal 4 into specific voltages. The voltage inputs 6, are then directed to the transmit-receive means 7. These input voltages 6 from the logic control means 5 will control various phase shifting electronic devices on the transmit-receive means 7. A direct current power generation means 8 located in the system 1, but not on the transmit-receive means 7, generates electrical energy to supply various power amplification devices of the transmit-receive means 7. If the phased array active antenna system 1 is operated in a pulsed mode, a capacitative storage means 9, would be located within the system 1, but close to the transmit-receive means 7. The direct current power generation means 8, used in conjunction with the capacitative storage means 9 would provide a direct current energy signal 10 to the transmit-receive means 7 during active antenna system 1 operation. This pulsed, direct current energy signal 10 would supply electrical energy to various devices on the transmit-receive means 7. Heat would be generated by the various amplification devices on the transmit-receive means 7 during the transmission of a frequency signal 3. A heat dissipation means 11 would dissipate the heat away from the transmit-receive means 7. The transmit-receive means 7 during a radio frequency signal transmission would emit transmission signal 12. Transmission signal 12 would have a specific, predetermined phase shift and frequency. Transmission signal 12 would enter some signal isolation means 13 prior to entering the antenna means 14. Signal isolation means 13 would be operable to transmit or receive a radio frequency in one direction only, i.e., an output signal 12 would not be transmitted while a signal 12a was being received by the antenna means 14. The antenna means 14 would be operable to transmit a signal 12, or receive a signal 12a in a predetermined frequency range. The received signal 12a would enter the transmit-receive means 7, where after; amplification, attenuation and phase shifting signal 12a would be transmitted within the system 1 to the central processing means 2 for analysis.

Figure 2:
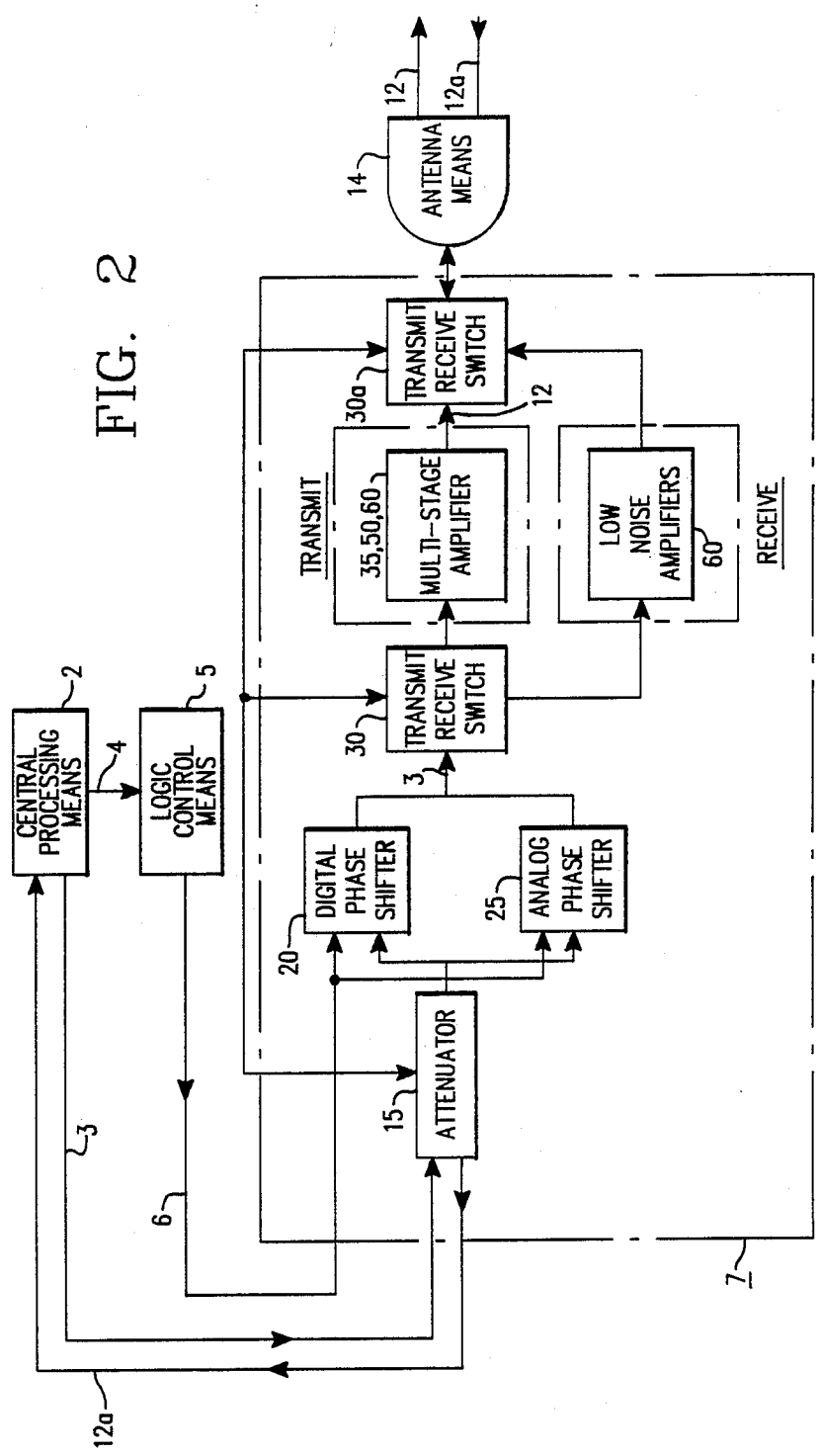
FIG. 2 is a flowchart of the individual means necessary for a transmit-receive means as used in a phased array active antenna system.

FIG. 2 is a flowchart of the various means necessary for a transmit-receive means 7 as used in a phased array active antenna system 1. The central processing means 2 supplies a radio frequency signal 3 to the transmit-receive means 7. The central processing means 2 also supplies a coded logic control signal 4 to the logic control means 5. The logic control means decodes the signal 4 and produces input voltages 6 to the transmit-receive means 7. The logic control input voltage 6, and the radio frequency signal 3 from the central processing means 2, enter the transmit-receive means 7 through the attenuator means 15, and the various phase shifting devices (digital 20 and analog 25), respectively. The logic control voltages 6 set the phase shifting devices 20, 25 to a predetermined phase shift. The attenuator 15 receives the radio frequency signal 3 and reduces it. This reduced signal enters the digital phase shifter 20 where it can be phase shifted from its original phase *either* zero degrees *or* a full one hundred and eighty degrees. A digital phase shifter 20 used in conjunction with an analog phase shifting device 25 would produce a phase shift of a full three hundred and sixty degrees. An analog phase shifter 25 is capable of producing a radio frequency phase shift of between zero degrees *through* one hundred and eighty degrees. Transmit-receive switch 30 would be operable as a signal isolation means. The attenuated, phase shifted signal 3 would next pass through the transmit-receive switch 30. When this electrically actuated transmit-receive switch 30 is closed, the radio frequency signal 3 would enter into a multi-stage amplifier 35, 50, 60. This multi-stage amplifier 35, 50, 60 would boost the amplifier output signal 12 to a predetermined power level. A second transmit-receive switch 30a would finally receive this amplified signal 12 and if switch 30a was in the closed position it would direct the output signal 12 to the antenna means 14 for transmission to the environment outside the antenna system 1. A signal 12a received by the antenna means 14 would enter the second transmit-receive switch 30a. This signal isolation means 30a would serve to separate the output signal 12 and the received signal 12a. An open transmit-receive switch 30a would direct the received signal 12a into the low noise amplifier stage 60. This weak, received signal 12a would be amplified in this low noise amplification stage 60. The amplified signal 12a would then enter the first transmit-receive switch 30 where if open it would transmit signal 12a into the analog 25 and digital 20 phase shifting devices. After appropriate phase shifting the radio frequency signal 12a would enter into attenuation means 15. After the received signal 12a was attenuated it would exit the transmit-receive means 7 and enter into the central processing means 2 for analysis by the central processing means.

Figure 3:
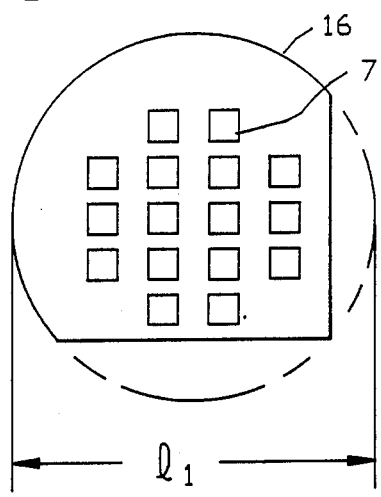
FIG. 3 is a plan view of sixteen transmit-receive cells on a single uncut wafer of semiconductor material, three inch (7.62 cm) format.

FIG. 3 is a plan view of sixteen individual transmit-receive cells 7 on a single wafer 16 of semiconductor material. The wafer 16 in FIG. 3 is $L_1$ or approximately 3 inches (7.62 cm) in diameter.

Figure 3A:
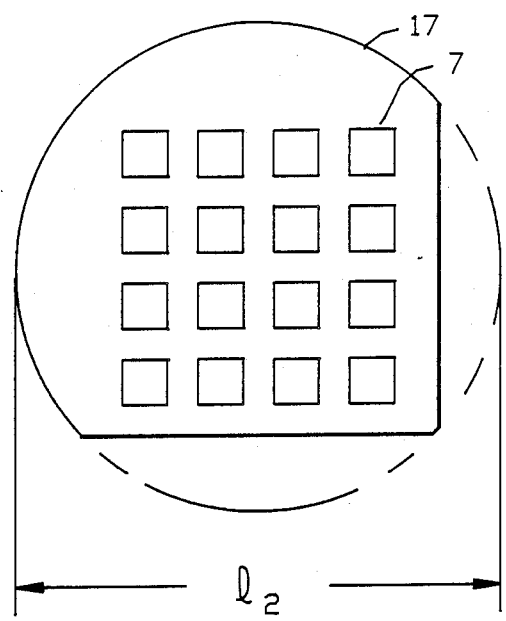
FIG. 3A is a plan view of sixteen transmit-receive cells in a single, uncut wafer of semiconductor material, four inch (10.16 cm) format.

FIG. 3A is a plan view of sixteen individual transmit-receive cells 7 on a single wafer 17 of semiconductor material. The wafer 17 in FIG. 3A is $L_2$ or approximately 4 inches (10.16 cm) in diameter and is representative of the size of the transmit-receive means 7 array of the preferred embodiment.

Figure 3B:
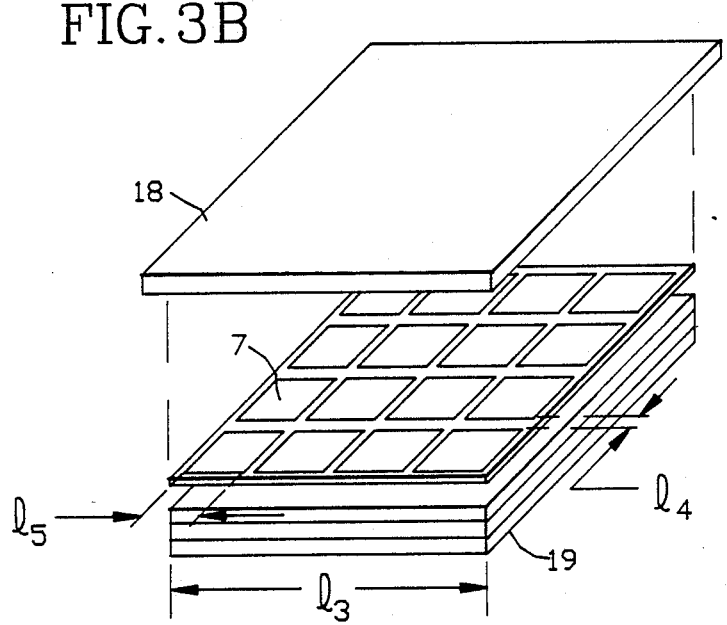
FIG. 3B is an exploded view of the array of sixteen transmit-receive cells on a single uncut wafer of semiconductor material, four inch (10.16 cm) format with sealed lid.

FIG. 3B is an exploded view of an array of sixteen transmit-recieve cells 7 all upon an uncut common wafer of semiconductor material. The dimension $L_4$ represents a spacing of approximately 0.1 inch (0.254 cm) between each individual transmit-receive cell. Dimension $L_5$ represents the approximate width of each transmit-receive cell 7 of 0.395 inches (1.00 cm). The overall length of the common wafer of semiconductor material 17, having a four-by-four array of transmit-receive cells would be approximately 2.08 inches (5.28 cm). The multi-layer ceramic support means 19 upon which the single layer 17 of semiconductor material is mounted upon is shown in FIG. 3B. In the fabrication of the transmit-receive cell 7 array, a sealed lid 18 would enclose the surface of the transmit-receive cell 7 array.

Figure 4:
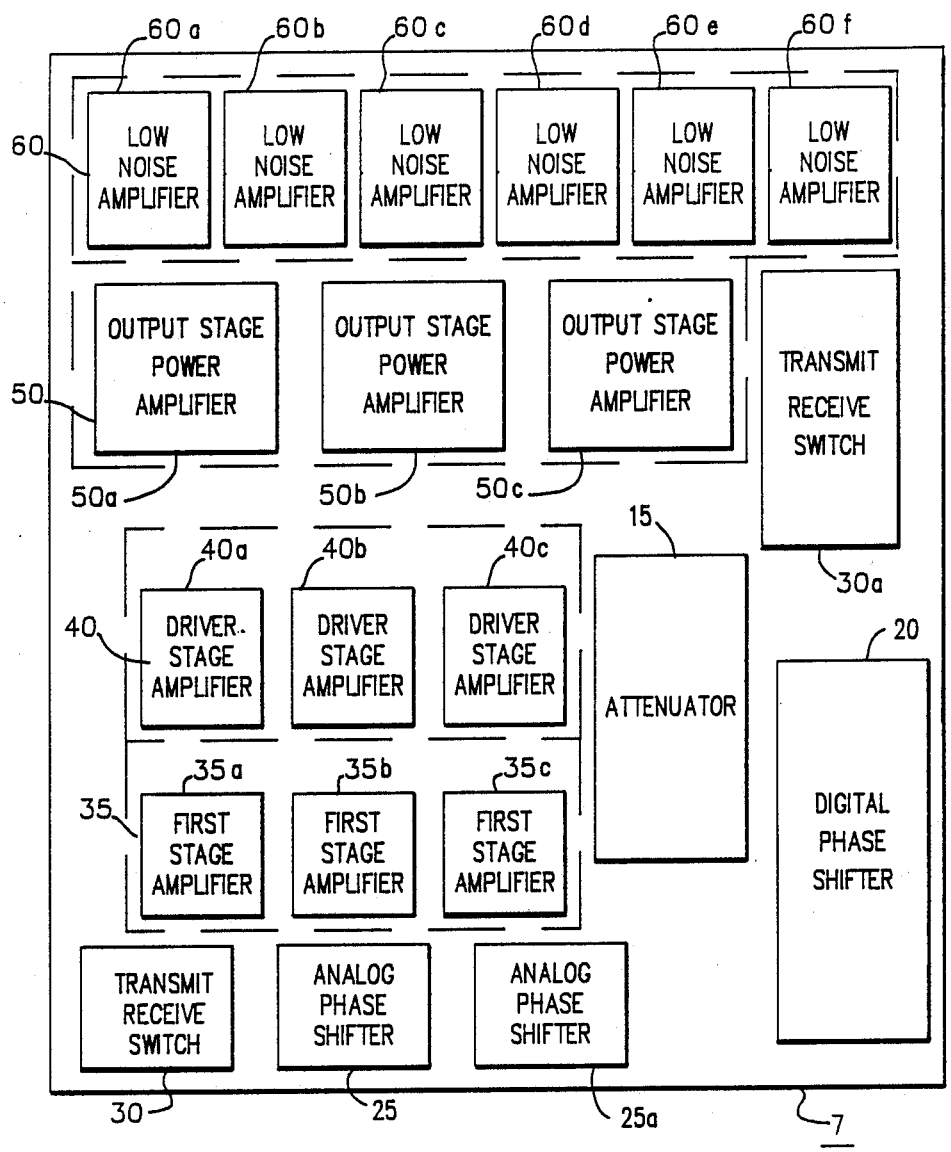
FIG. 4 is a chart showing the relative positions of the individual, redundant electronic devices on a single transmit-receive cell.

FIG. 4 is a chart showing the relative positions of the individual, redundant electronic devices on the single transmit-receive cell 7. Specifically, upon this single cell 7 we have an attenuator 15, a digital phase shifter 20, analog phase shifters 25 and 25a, a first transmit-receive switch 30, a three stage amplification system 35, 40, 50, a low noise amplification system 60 for weak received radio frequency signals and a second transmit-receive switch 30a. Each stage, 35, 40 and 50, of the three stage amplification system is a triple redundant system. The first stage 35, comprises three distinct first stage amplifiers 35a, 35b, and 35c. The second stage or driver stage 40, comprises amplifiers 40a, 40b and 40c. Finally, the output stage amplifier system 50 comprises three output amplifiers 50a, 50b, 50c. Amplification systems 35, 40 and 50 would be used in the signal transmit circuit. Low noise amplifiers 60a, 60b, 60c, 60d, 60e, and 60f would be utilized for weak received radio frequency signals. Note: that only one amplifier in the first stage system 35 need be operational, only one amplifier of either the driver stage 40 or the output stage 50 and only two of the six low noise amplifiers 60a–60f must function to achieve a fully operative transmit-receive cell. Also only one of the two analog phase shifters 25, 25a must function for the transmit-receive cell 7 to operate.

Figure 5:
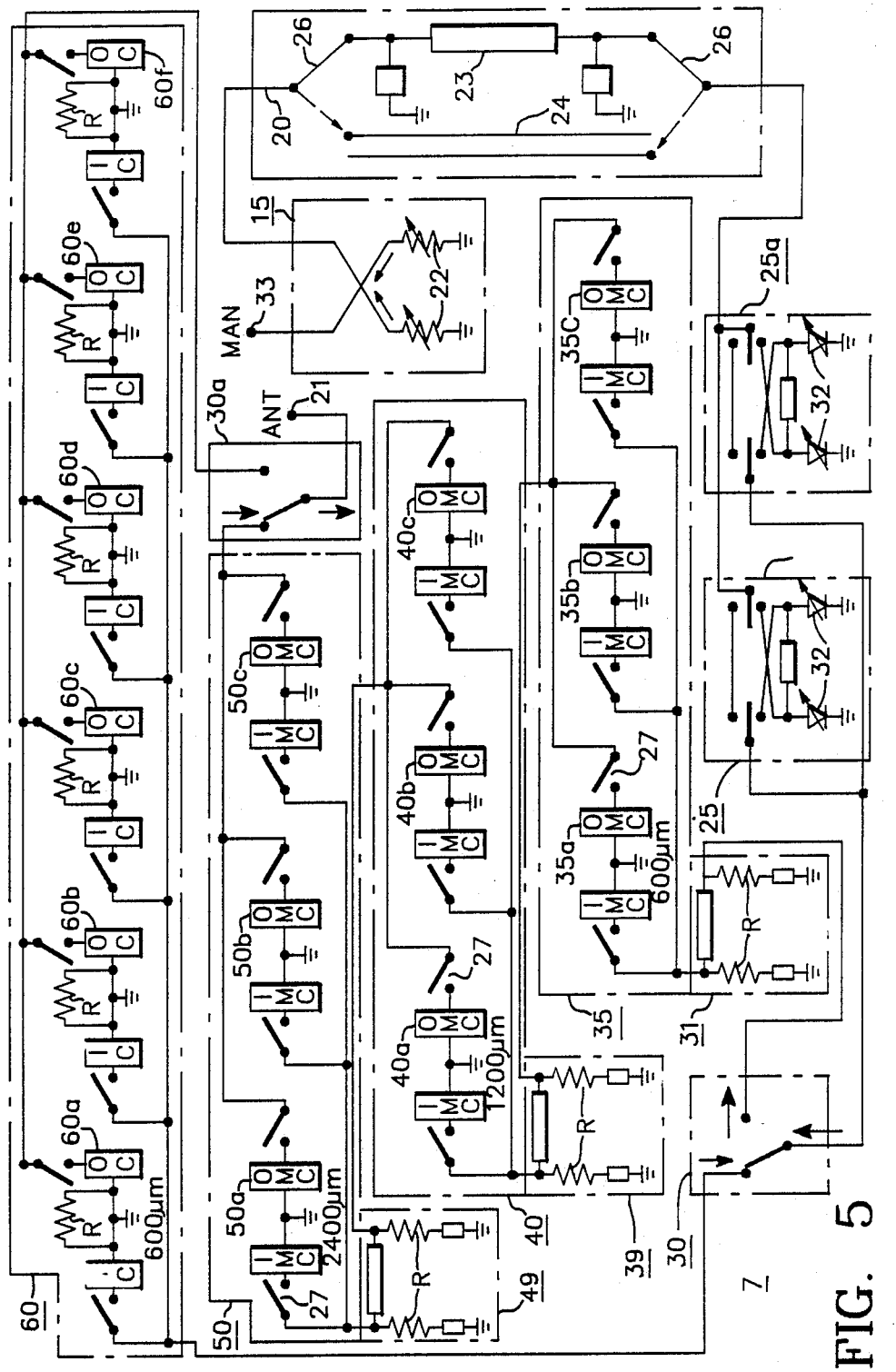
FIG. 5 is a schematic representation of the individual, redundant electronic devices on a single transmit-receive cell.

FIG. 5 is a schematic representation of the individual, redundant electronic devices on a single transmit-receive cell 7. A signal 3 from the radio frequency manifold enters the transmit-receive cell 7 at via 21. This signal 3 enters the attenuator 15. The signal 3 is split and enters two legs formed by variable voltage resistors 22, or field effect transistors. Signal 3 is divided in one half and reflected through the field effect transistors 22. The reflected summed signal from the field effect transistors 22 is the result of the voltages applied to the field effect tansistors 22. The reduced, reflected signal 3 then enters the digital phase shifter 20. The digital phase shifter which comprises a $\pi$ network 23 and a coupled line segment 24 utilizes field effect transistors 26 to switch between the $\pi$ network 23 and the coupled line segment 24. If the signal 3 passes through the $\pi$ network the signal 3 will be phase shifted 180° from its input phase. If the signal 3 passes through the coupled line segment 24, the signal 3 will be phase shifted 0°. The signal 3 enters the analog phase shifter 25 or 25a through a mitered mechanical switch 27. This mitered mechanical switch 27 is used throughout the transmit-receive cell 7 to selectively interconnect various electronic devices. The analog phase shifters 25 or 25a are operable, utilizing continuously variable varactors having varactor diodes, to phase shift the signal 3 from the digital phase shifter 20 from 0° through 180°. The combination of the digital phase shifter 20 and one of the analog phase shifters 25 or 25a results in a potential RF signal phase shift of 0° through 360°. The phase shifted signal 3 now enters an electrically actuated transmit-receive switch 30. If this transmit-receive cell 7 is in the transmit mode this switch will be closed and connected to the transmit circuit and the signal 3 will enter a first stage gain control means 31. A gain control means such as a lossy equilizer or a lumped element resonator would be used to maintain the RF signal's 12 gain to a 50Ω system within each amplification stage 35, 40 and 50. The first stage gain control means 31 precedes first amplification stage 35. Three first stage amplifiers 35a, 35b and 36c are available for use. The first stage amplifiers 35a, 35b and 35c are all identical having input and output matching circuitry and a 600μ field effect transistor. These amplifiers are capable of producing onequarter watt of power. Amplified signal 3 enters the driver stage gain control means 39, precedent to entering the driver stage amplifier system 40. This stage 40 comprises three independent, redundant amplifiers, 40a, 40band 40c. Only one amplifier is required at this stage—each amplifier has input and output matching circuitry and an equivalent 1200μ field effect transistor. The driver stage amplifiers are capable of producing one-half watt of power. Finally, twice amplified signal 12 enters output stage amplification system 50 with its three amplifiers 50a, 50b and 50c. Again, only one amplifier 50a, 50b or 50c need be operational. Each amplifier 50a, 50b or 50c has input and output matching circuitry and an equivalent 2400μ field effect transistor. Each output amplifier 50a, 50b or 50c is operable to produce one full watt of power. The signal 3 now exits the output stage 50 into a second transmit-receive switch 30a where if this switch is closed, signal 12 will exit the transmit-receive cell through antenna via 33 as transmitted signal 12. A received RF signal 12a enters the transmit-receive cell through the antenna via 33. This weak signal 12a encounters the second transmit-receive switch 30a. If the transmit-receive cell 7 is in the receive mode the electrically actuated transmit-receive cell 30a will be closed and will direct received signal 12a to the low noise amplification stage 60. Only two of the six low noise amplifiers 60a, 60b, 60c, 60d, 60e and 60f need be operational to boost the weak, received, RF signal 12a. The individual, identical low noise amplifiers 60a, 60b, 60c, 60d, 60e and 60f comprise; a feed back loop, input and output matching circuitry and a 600μ field effect transistor. After signal 12a is amplified it enters the first transmit-receive switch 30 where if the switch 30 is closed into the receive circuit signal 12a is directed into the analog phase shifter 25 or 25a, the digital phase shifter 20 and finally the attenuator 15. After the attenuator 15, the signal 12a enters the manifold via 21 for transmittal away from the transmit-receive cell 7 and to the central processing unit 2 for analysis.

Figure 6:
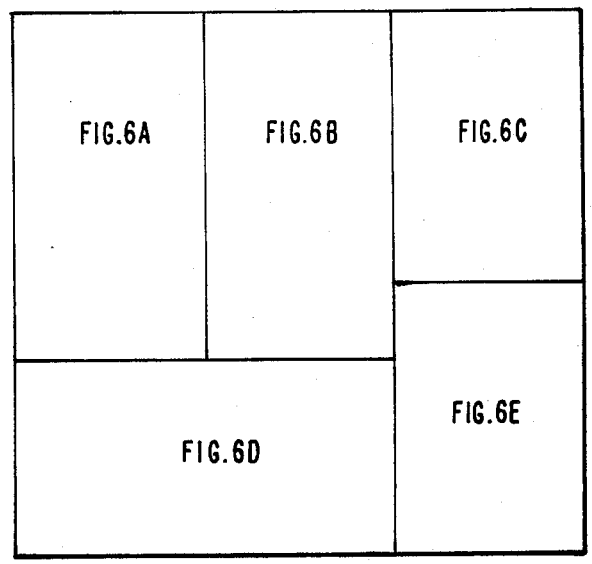
FIG. 6 is a chart showing the relative positions of various groups of devices as they appear on the surface of an individual transmit-receive means.

FIG. 6 is a chart showing the relative positions of the various groups of devices as they actually, physically appear on the surface of the individual transmit-receive cell means. Subsequent FIGS. 6A, 6B, 6C, 6D and 6E detail the entire surface topography of the cell means.

Figure 6A:
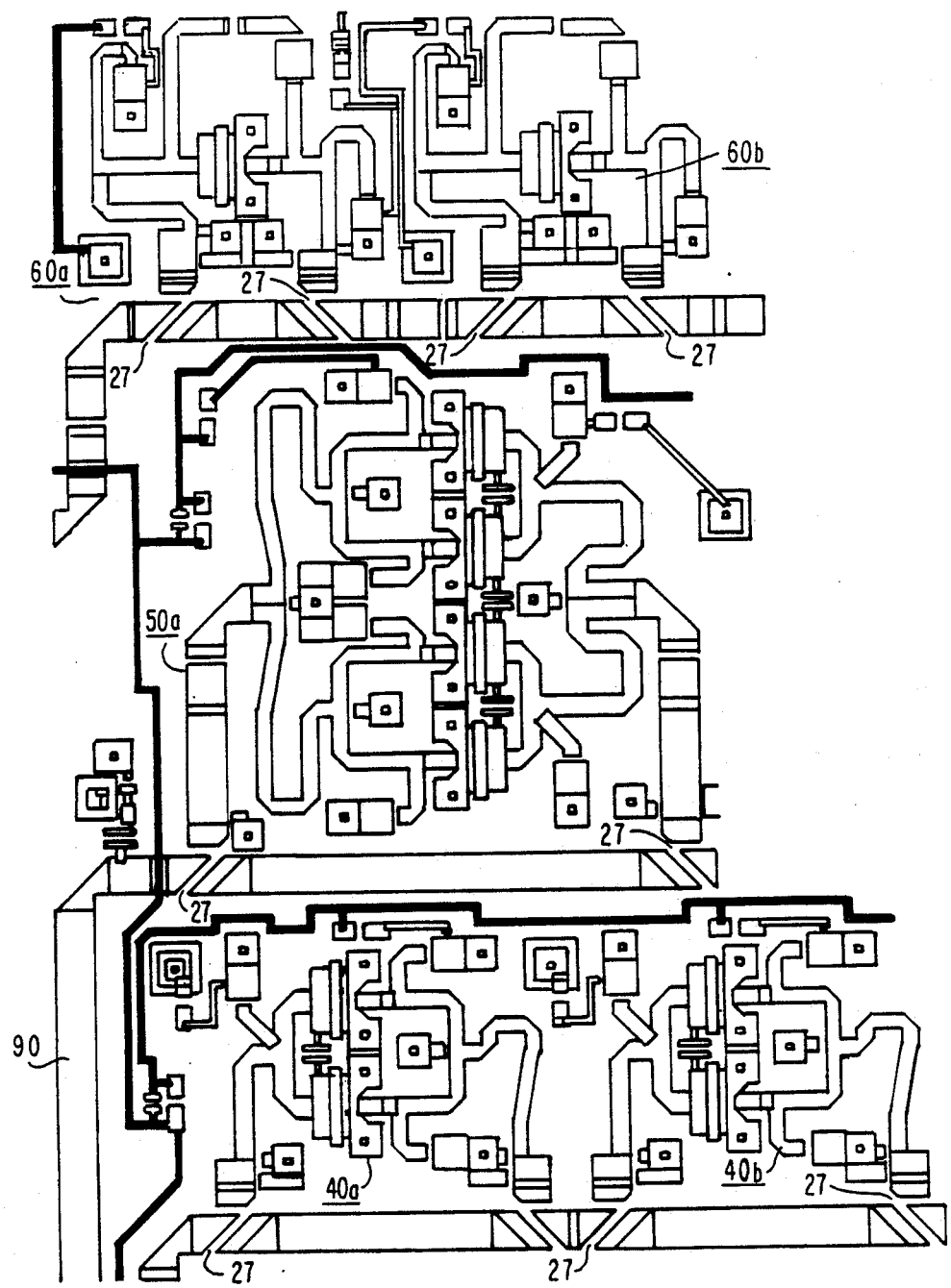
FIG. 6A is a plan view of the devices located in the portion shown as A on FIG. 6.

FIG. 6A is a plan view of the upper left-hand corner of the transmit-receive cell 7. This FIG. 6A comprises driver stage amplifiers 40a and 40b, output amplifier 50a and low noise amplifiers 60a and 60b. Mitered mechanical switches 27 can be seen interconnecting the individual devices.

Figure 6B:
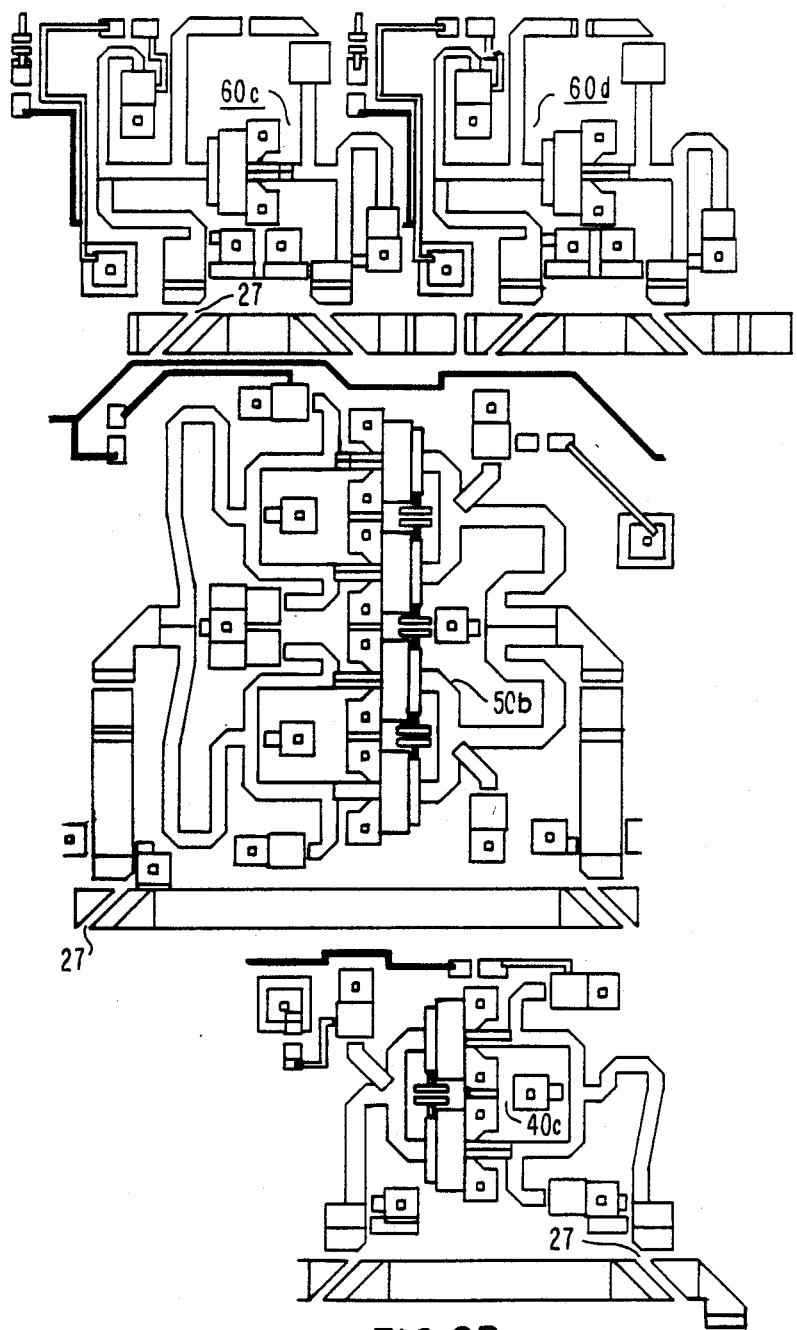
FIG. 6B is a plan view of the devices located in the portion shown as B on FIG. 6.

FIG. 6B is a plan view of the upper middle quadrant of transmit-receive cell 7. Driver stage amplifier 40c, output power amplifier 50b and low noise amplifiers 60c and 60d comprise this quadrant and output amplifier gain control means 90. Again, mechanical mitered switches 27 interconnect the various devices.

Figure 6C:
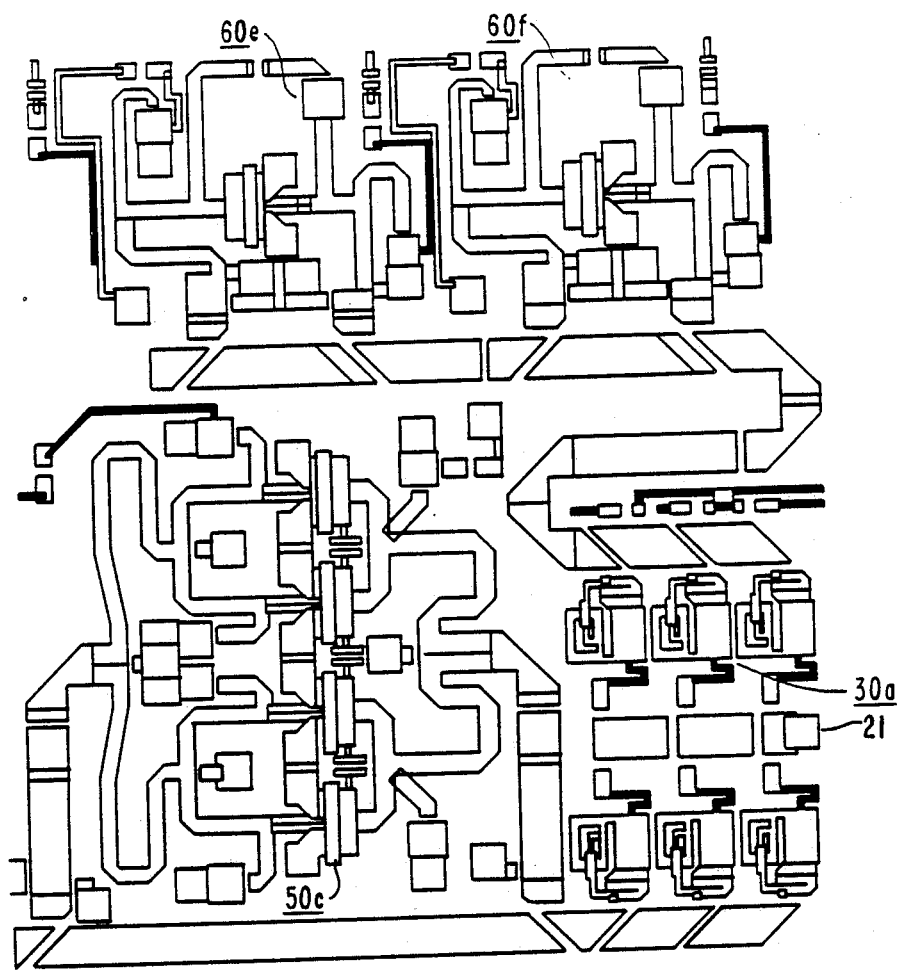
FIG. 6C is a plan view of the devices located in the portion shown as C on FIG. 6.

FIG. 6C is a plan view of the upper right-hand corner of the transmit-receive cell 7. Output amplifier 50c, low noise amplifiers 60e and 60f and the second transmit-receive switch 30a comprise the devices in this quadrant. The antenna via 33 is shown as a part of the second transmit-receive switch 30a.

Figure 6D:
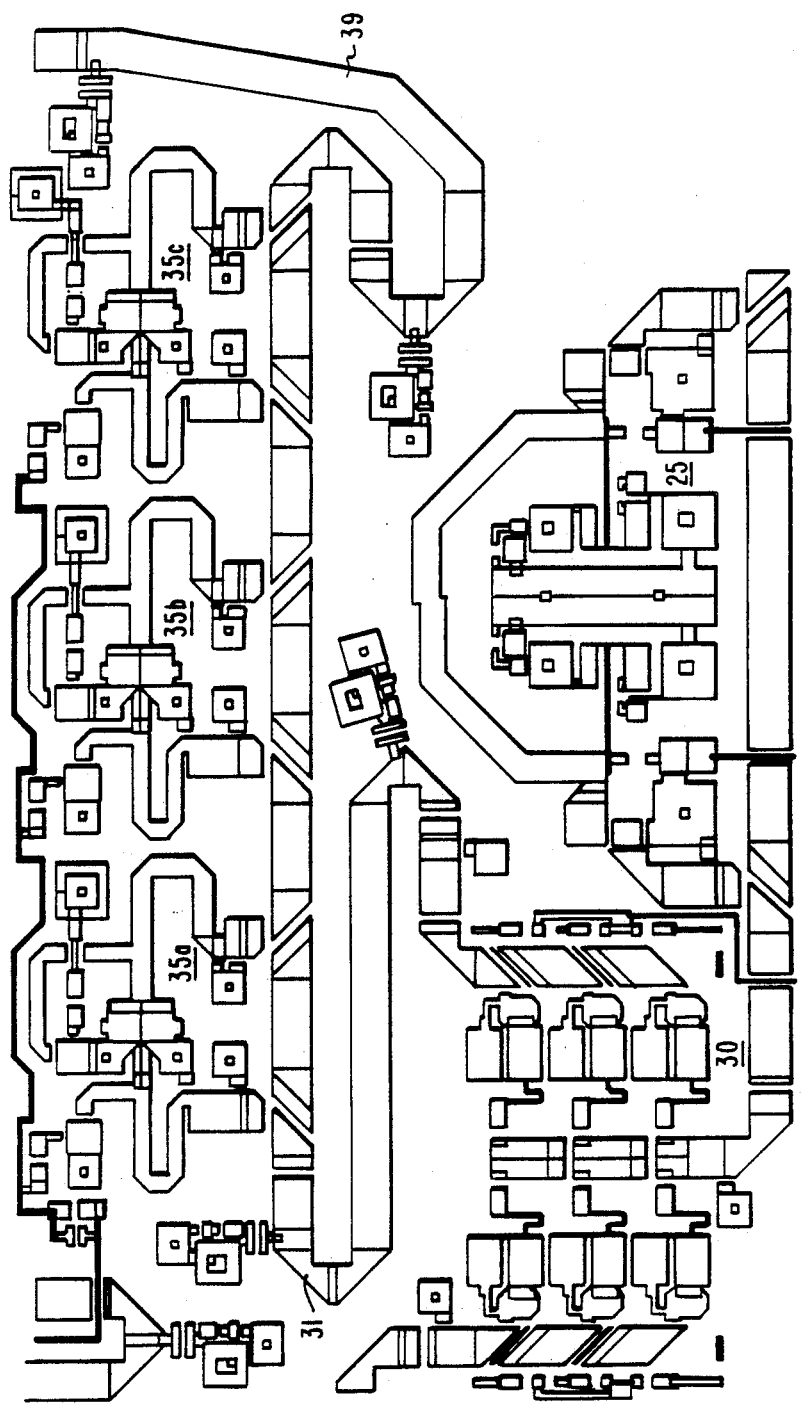
FIG. 6D is a plan view of the devices located in the portion shown as D in FIG. 6.

FIG. 6D is a plan view of the lower left-hand corner and lower middle quadrant of the transmit-receive cell 7. First stage amplifiers 35a, 35b and 35c, transmit-receive switch 30, analog phase shifter 25 and first stage gain control means 31, and driver stage gain control means 39 comprise the devices in this quadrant.

Figure 6E:
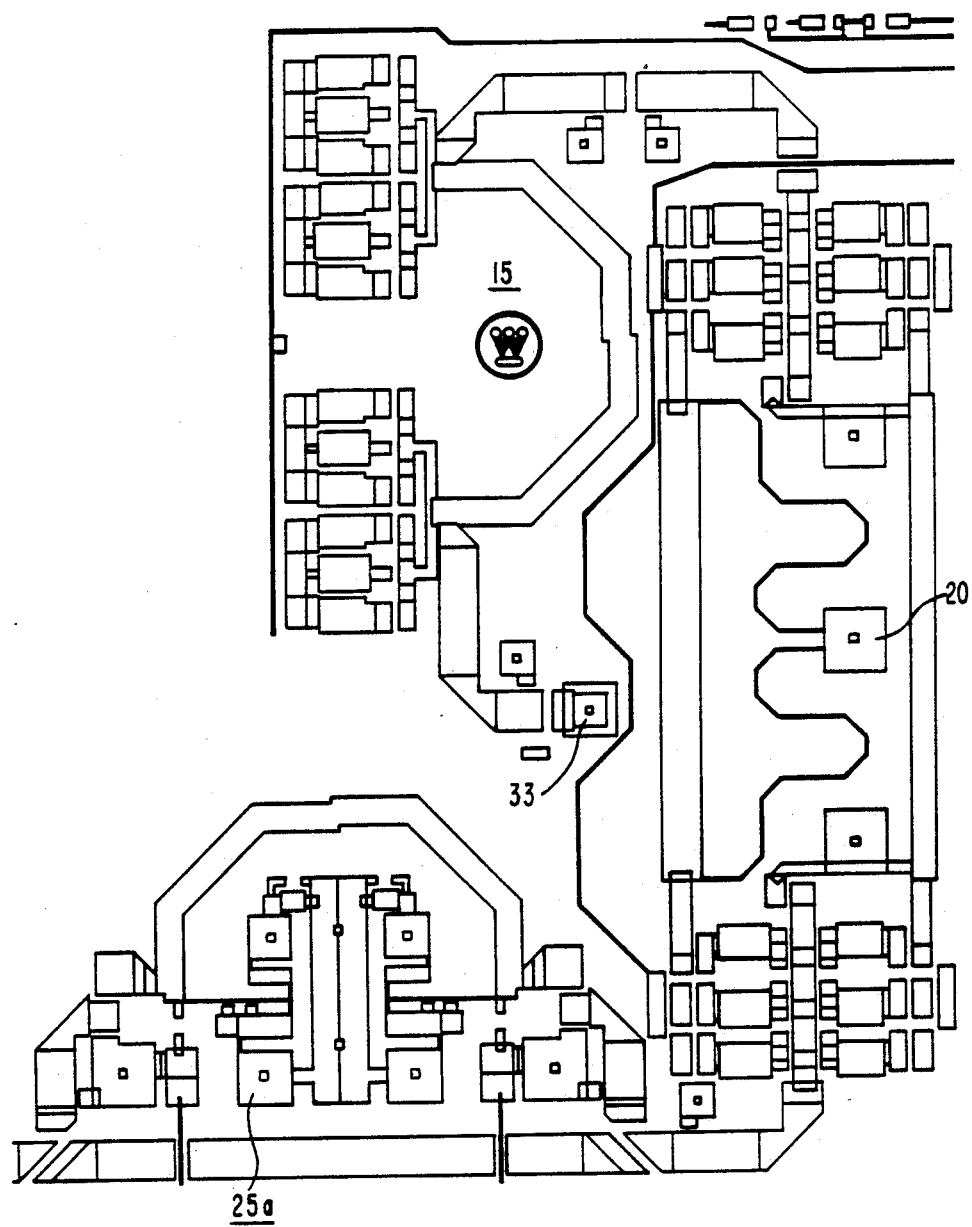
FIG. 6E is a plan view of the devices located in the portion shown as E in FIG. 6.

FIG. 6E is a plan view of the lower right-hand corner of the transmit-receive cell 7. Analog phase shifter 25a, digital phase shifter 20, attenuator 15 and manifold via 21 comprise the devices in this quadrant.

Figure 7:
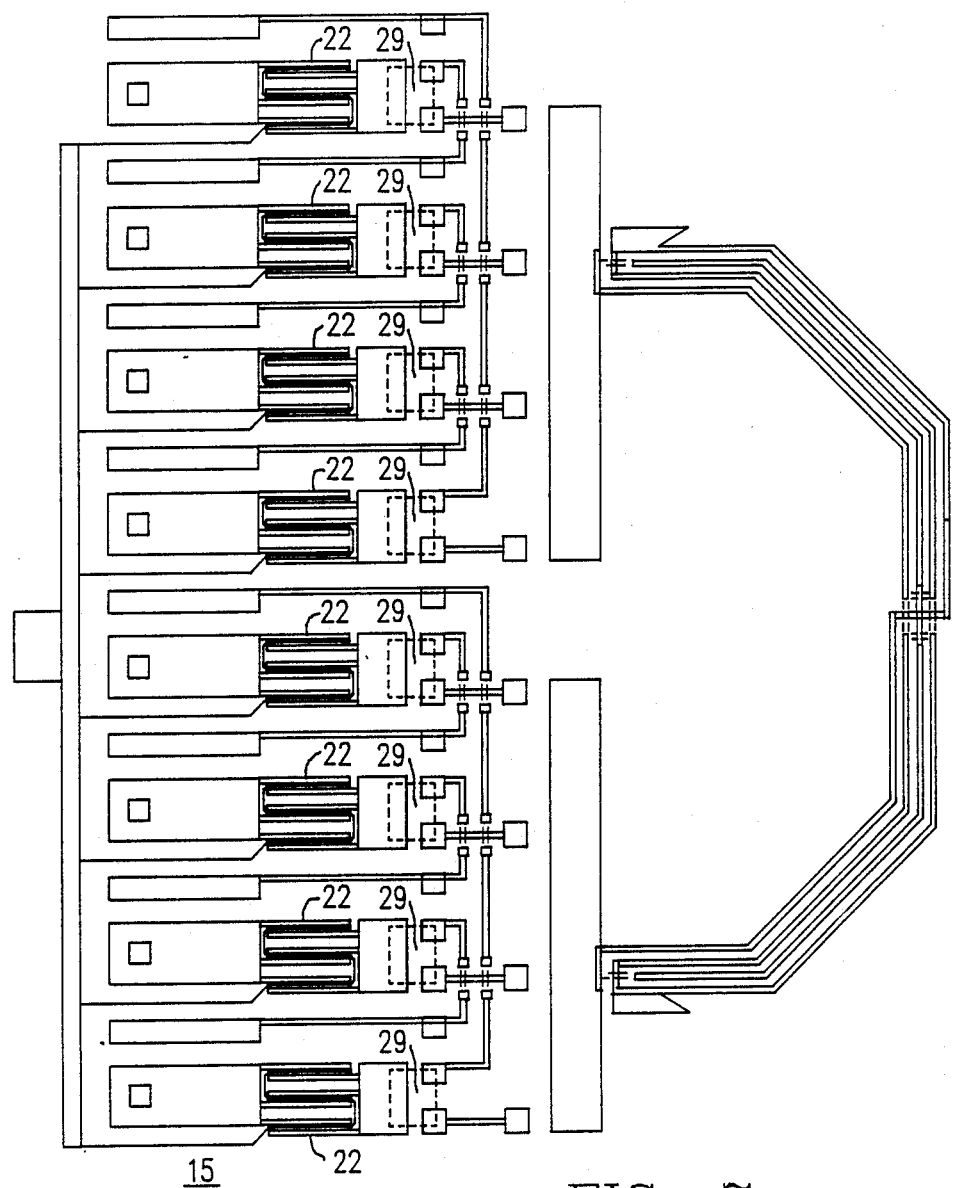
FIG. 7 is a plan view of the attenuator.

FIG. 7 is a plan view of the attenuator 15. Eight field effect transistors 22, are utilized in two groupings of four each. Only one field effect transistor 22 of each group of four must be operable for the attenuator to perform during fabrication and test of the transmit-receive cell 7. Functioning field effect transistors operable in the specified range would be selected and interconnected into the attenuator 15 by straight-through mechanical switches 29. The Westinghouse patent, U.S. Pat. No. 3,681,134 to Nathanson et al., teaches a a low capacitance configurable switch operable to serve as a straight-through mechanical switch.

Figure 7A:
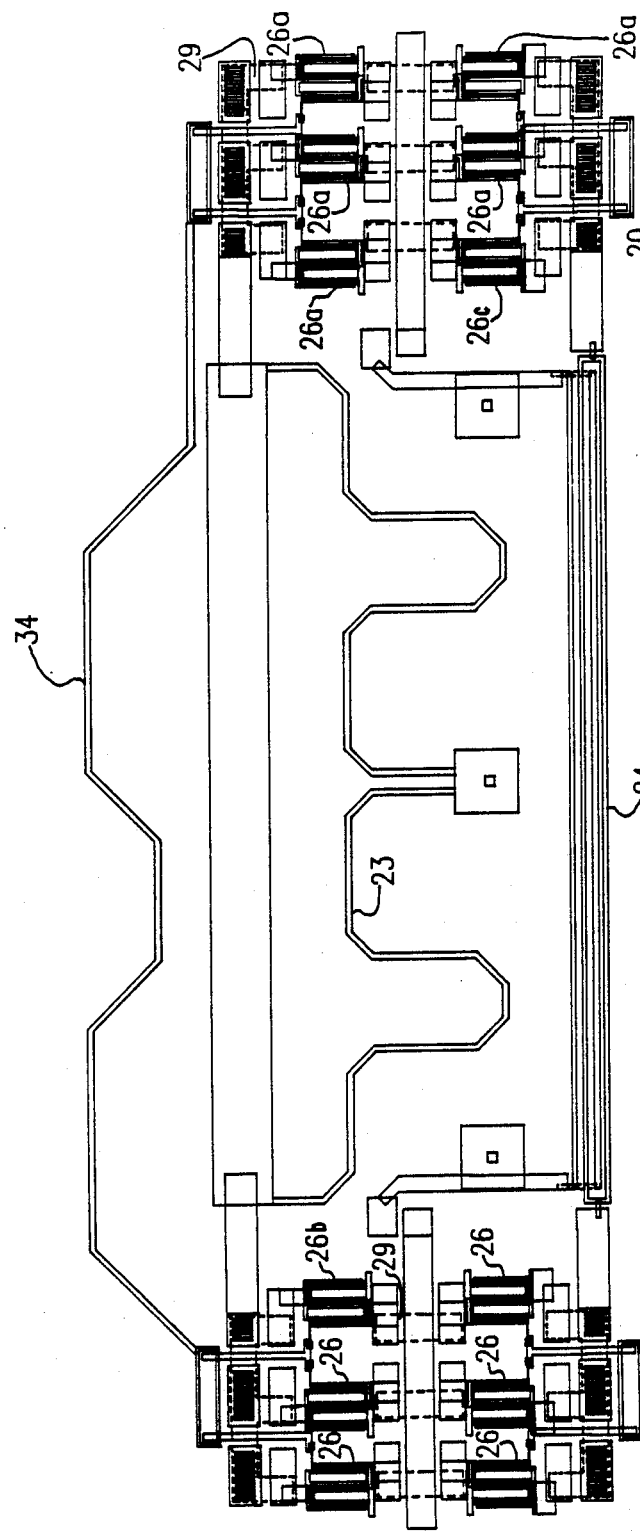
FIG. 7A is a plan view of the digital phase shifter.

FIG. 7A is a plan view of the digital phase shifter 20. The $\pi$ network 23 of the digital phase shifter 20 is operable to phase shift the radio frequency signal 180° from its received phase. The coupled line segment 24 will pass the signal through the digital phase shifter 20 with a 0° phase shift. The field effect transistors 26, 26a occur in two groups of six each. Only one field effect transistor of group 26, 26a must be operable to serve as a field effect transistor switch between the $\pi$ network 23 and the coupled line segment 24. Straight-through switches 29 allow the incorporation of the individual functional field effect transistors 26 or 26a during the transmit-recieve cell 7 fabrication and test. Line 34 is a microstrip direct current distribution line, operable to supply electrical energy to the field effect transistors of 26, 26a.

Figure 7B:
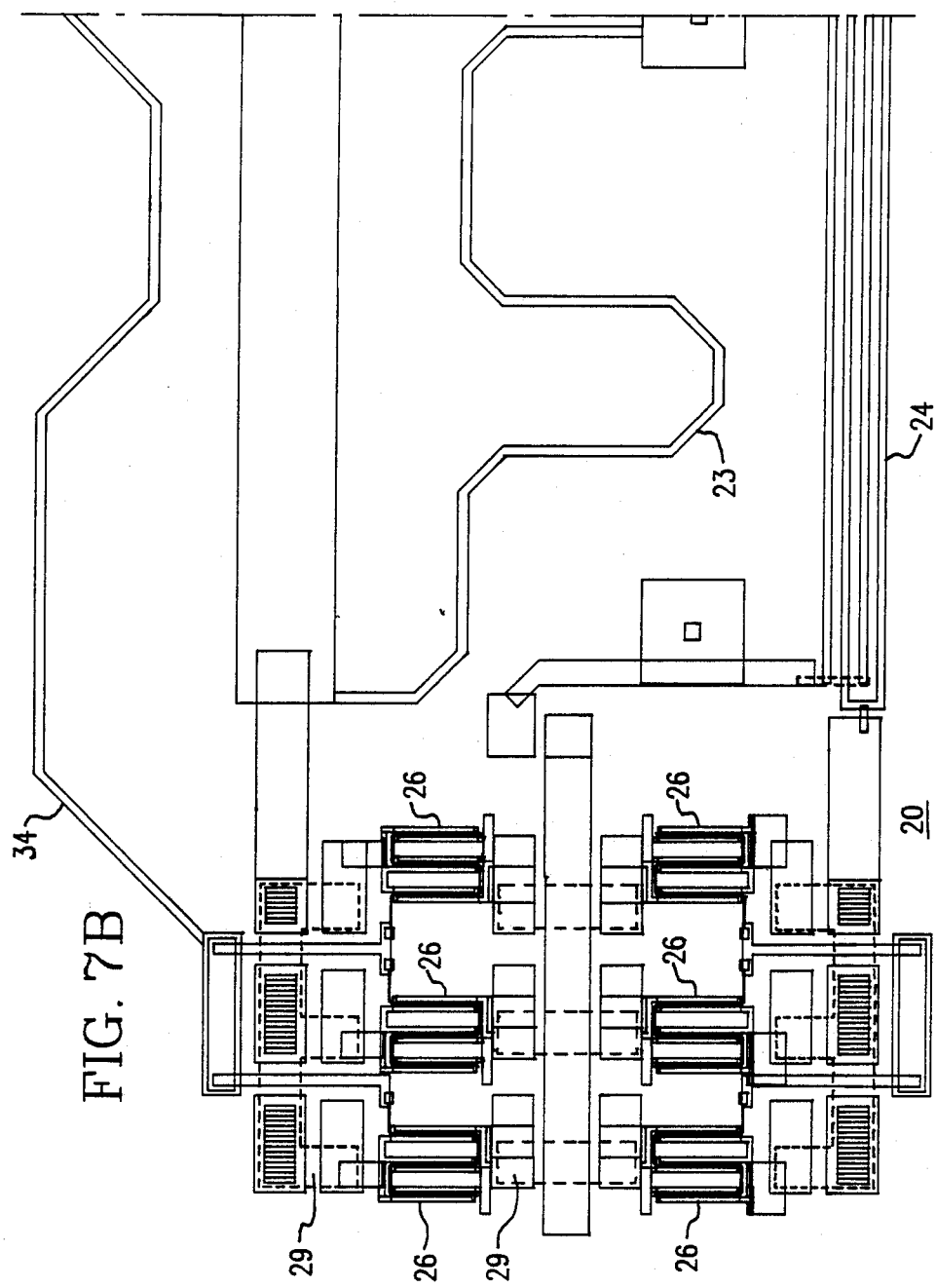
FIG. 7B is a plan view enlargement of the left side of the digital phase shifter.

FIG. 7B is a plan view enlargement of the left side of the digital phase shifter 20. One-half of the $\pi$ network 23 is shown as well as one-half of the coupled line segment 24. Six field effect transistors 26 offer multiple redundancy and a higher probability of a fully functional digital phase shifter 20, because only one must be operational among the six. Straight-through mechanical switches selectively incorporate each functional, field effect transistor 26. Microstrip line 34 is a direct current electrical energy distribution line supply power to the drain or sources of the selected field effect transistors 26.

Figure 7C:
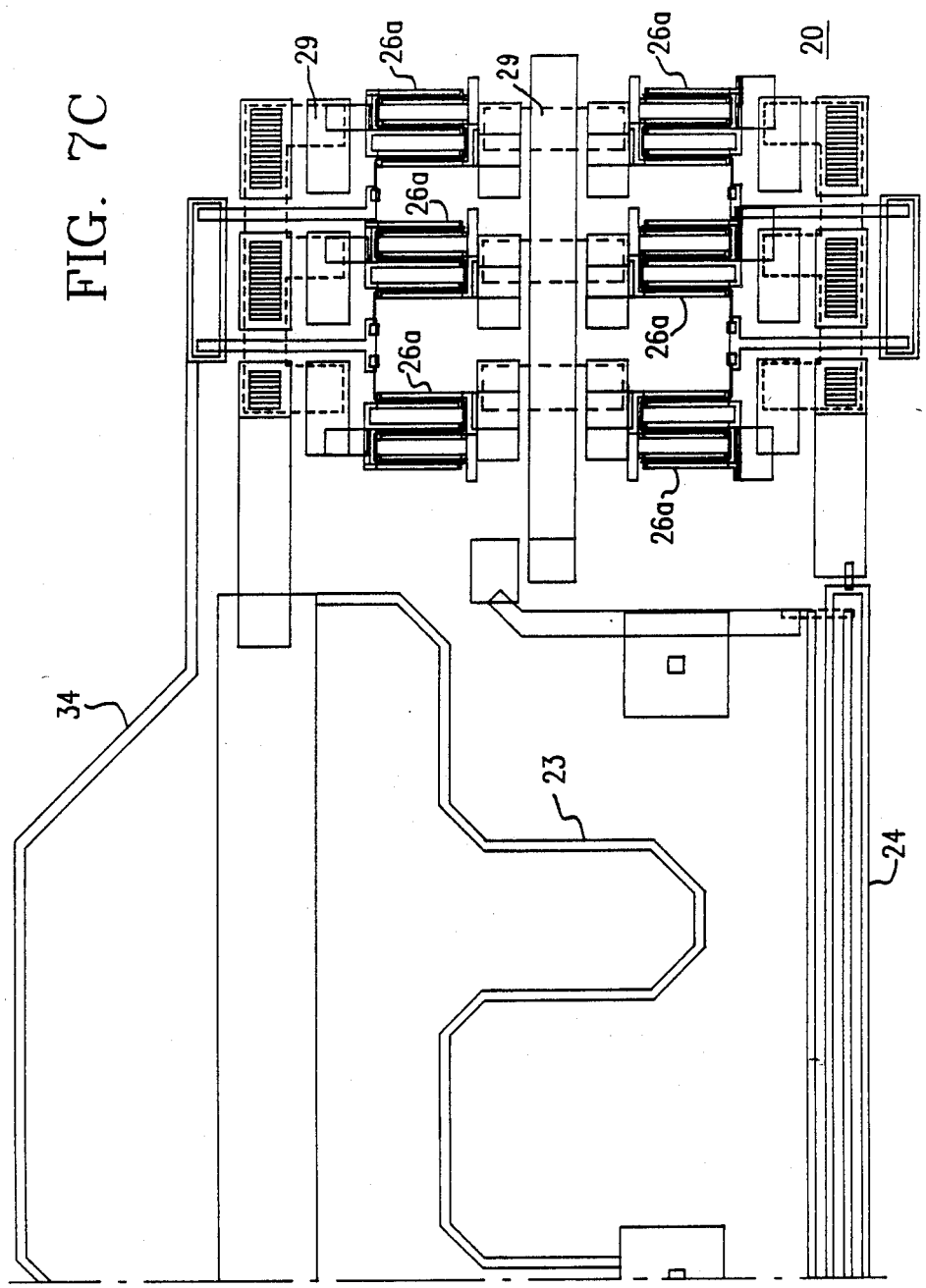
FIG. 7C is a plan view enlargement of the right side of the digital phase shifter.

FIG. 7C is a plan view enlargement of the right side of the digital phase shifter 20 direct current energy microstrip line 34 supplies electrical energy to the selected field effect transistor 26A. Only one field effect transistor 26A of the six need be operational for a fully functional digital phase shifter 20. One half of the $\pi$ network 23 and one-half of the coupled line segment 24 is seen in this enlargement of the right side of the digital phase shifter 20. Straight-through mechanical switches 29 serve to interconnect the selected field effect transistor of the group 26A.

Figure 7D:
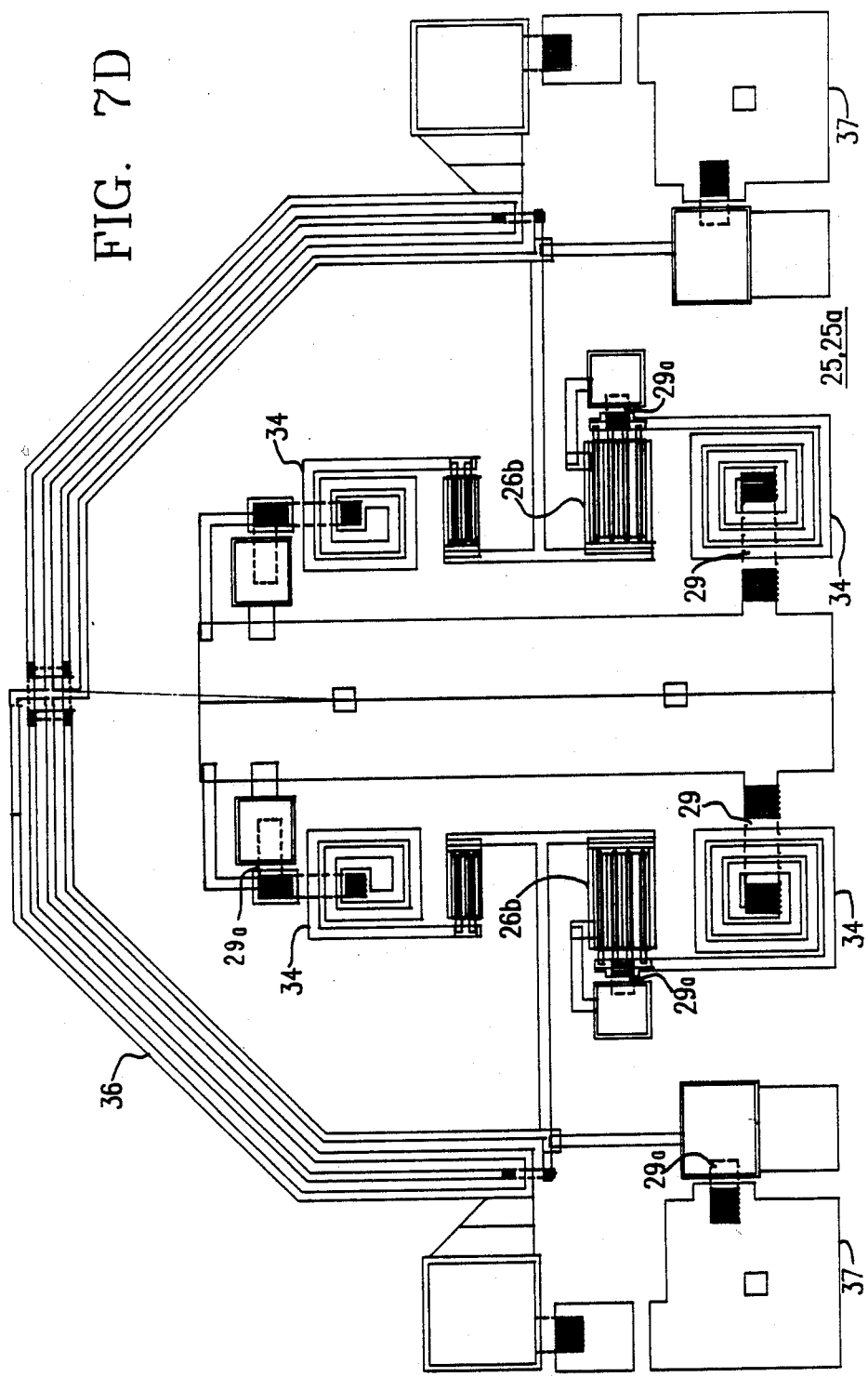
FIG. 7D is a plan view of the analog phase shifters.

FIG. 7D is a plan view of the analog phase shifter 25, 25A. During transmit-receive cell 7 fabrication and test, mitered mechanical switches 27 allow a selection of either phase shifter 25 or 25A. Both phase shifters are identical and both 25 or 25A comprise a coupled line segment 36, spiral inductances 34, dual field effect transistors 26B and dual capacitors 37. Individual elements are interconnected to form the analog phase shifter 25 or 25A using straight-through switches 29. A radio frequency signal 3 received from the digital phase shifter 20 will be phase shifted either 0°, through the coupled line segment 36 or through 180° when passed through the varactor network of spiral inductances 34 and field effect transistors 26B.

Figure 7E:
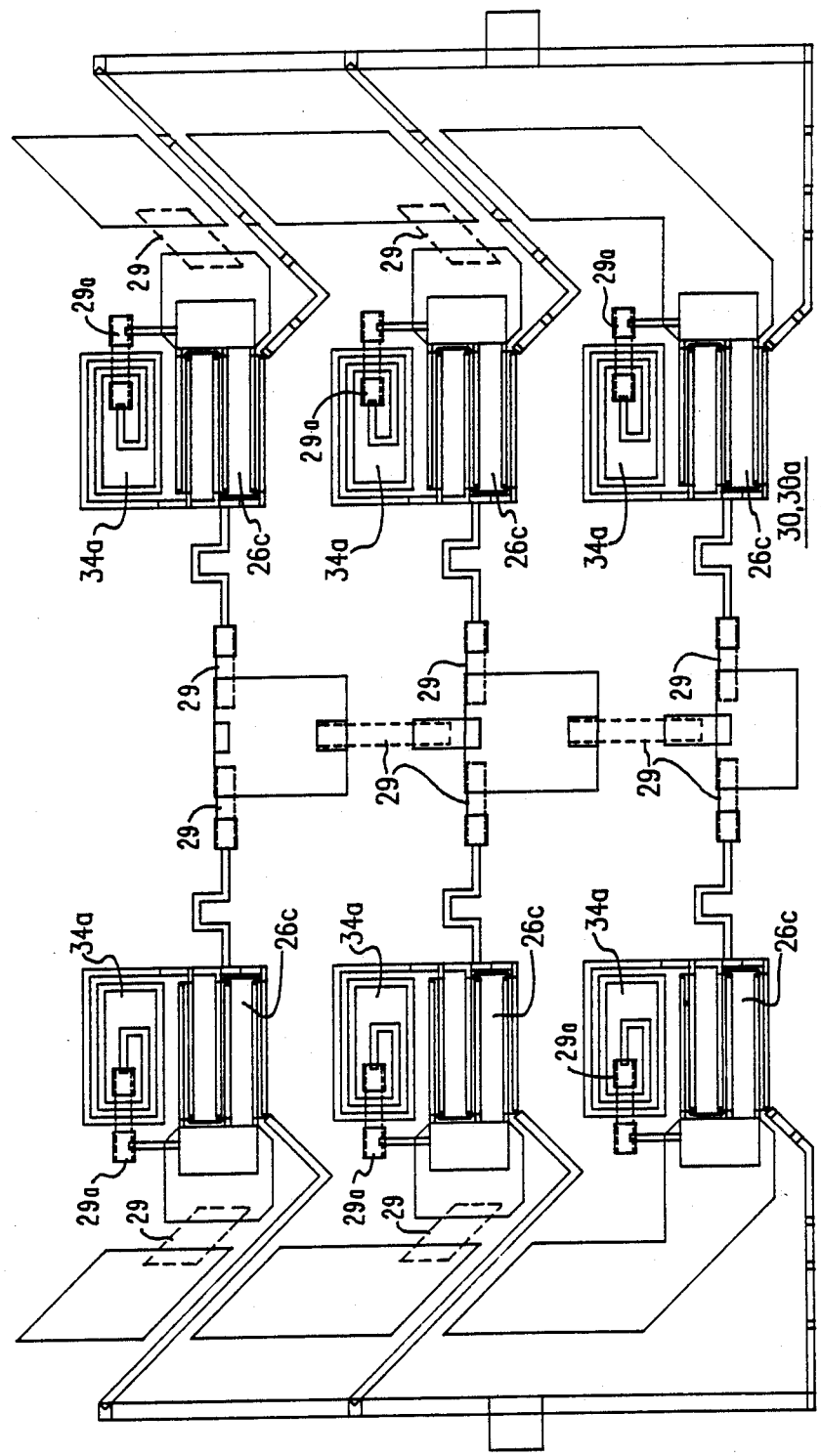
FIG. 7E is a plan view of the transmit-receive switch.

FIG. 7E is a plan view of the transmit-receive switch 30, 30a. This electrically actuated switch 30, 30a comprises two legs each of the three field effect transistors 26c in parallel with spiral inductances 34a. Only one field effect transistor 26c of each group of three must be functional for an operational transmit-receive switch 30, 30a. Again, straight-through switches 29 interconnect the selected field effect transistor 26c.

Figure 7F:
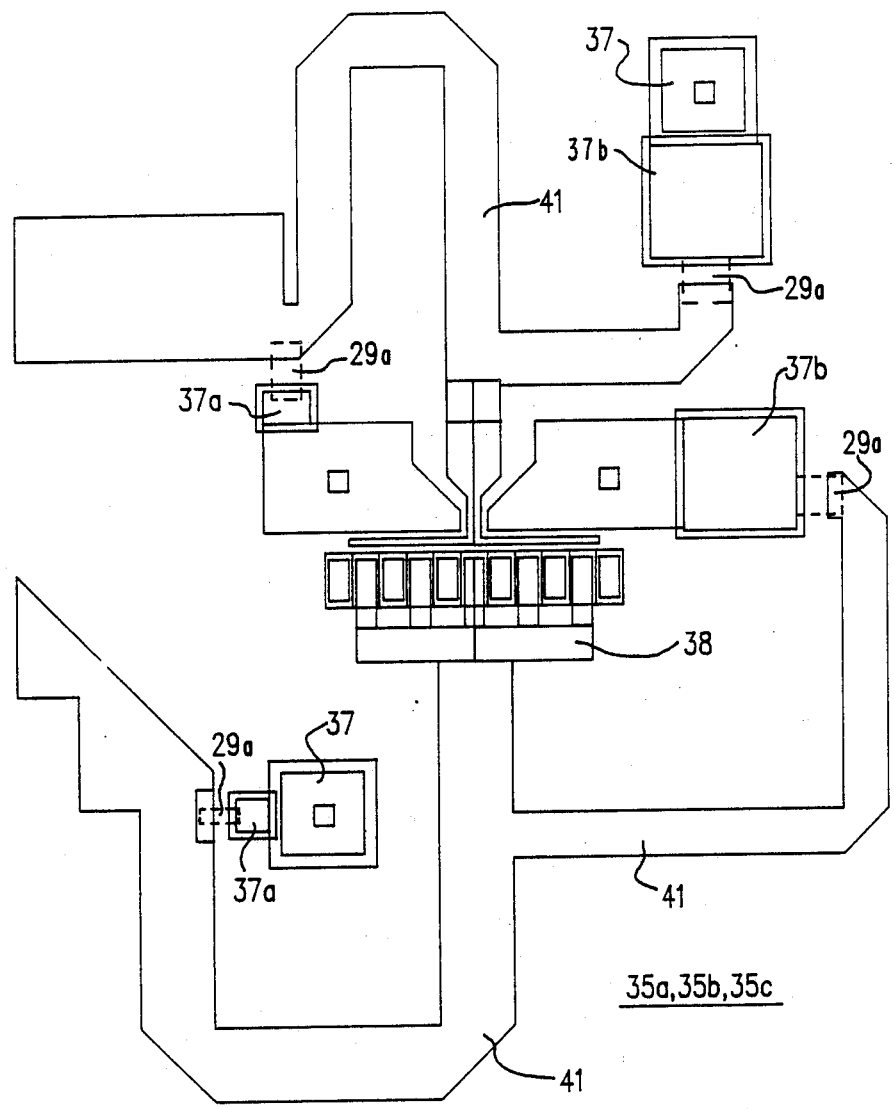
FIG. 7F is a plan view of the first stage amplifier.

FIG. 7F is a plan view of a first stage amplifier 35a, 35b or 35c. Only one of these three amplifiers 35a, 35b or 35c must be operational during transmit-receive cell 7 fabrication and test. Each amplifier is identical to the other two, and comprise, microstrip inductances 41, interconnected to selected capacitors 37, tuning capacitors 37A and radio frequency bypass capacitors 37B. These elements are interconnected using straight-through mechanical switches and are operable as input and output matching circuitry. The "heart" of the first stage amplifier, 35a, 35b or 35c is a 600$\mu$ field effect transistor 38. This 600$\mu$ field effect transistor 38 is operable to produce an output signal of one-quarter watt of power.

Figure 7G:
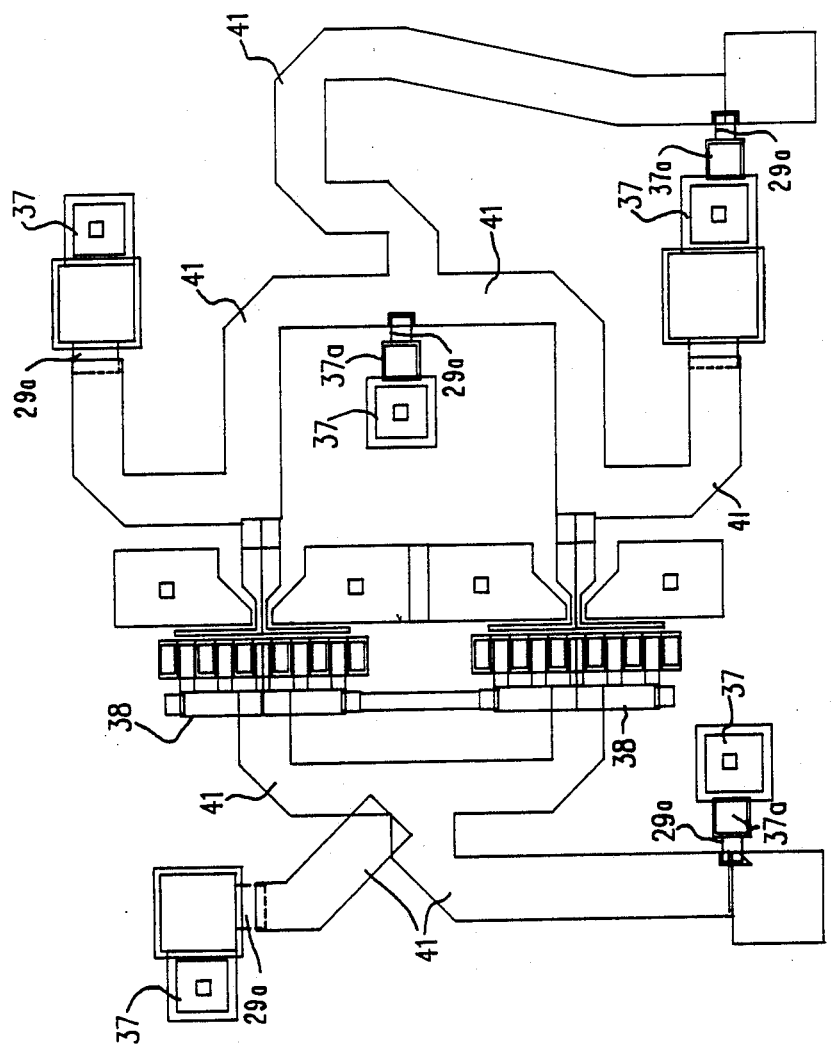
FIG. 7G is a plan view of the driver stage amplifier.

FIG. 7G is a plan view of the driver stage amplifier 40, 40b and 40c. Only one of these three amplifiers 40a, 40b and 40c must be operational during transmit-receive cell 7 fabrication and test. Each amplifier is identical to the other two, and comprise, microstrip inductances 41, interconnected to selected capacitors 37, and tuning capacitors 37A to form input and output matching circuitry. The "heart" of the driver stage amplifier are two field effect transistors 38. Each field effect transistor has a value of 600$\mu$ and are connected utilizing Westinghouse patented "cluster matching" technique, U.S. Pat. No. 4,547,745, to Freitag et al., this combination of two field effect transistors 38 results in a combined value of 1200$\mu$ with a resultant output power level of one-half watt of power. Therefore the output radio frequency signal 12 issued from the selected driver stage amplifier will have an output power of one-half watt. Again, straight-through switches 29 interconnect the matching circuitry elements, as necessary. The term "$\mu$" when referring to a field effect transistor 38 refers to the width of the channel of the field effect transistor 38 and its resultant power output capabilities.

Figure 7H:
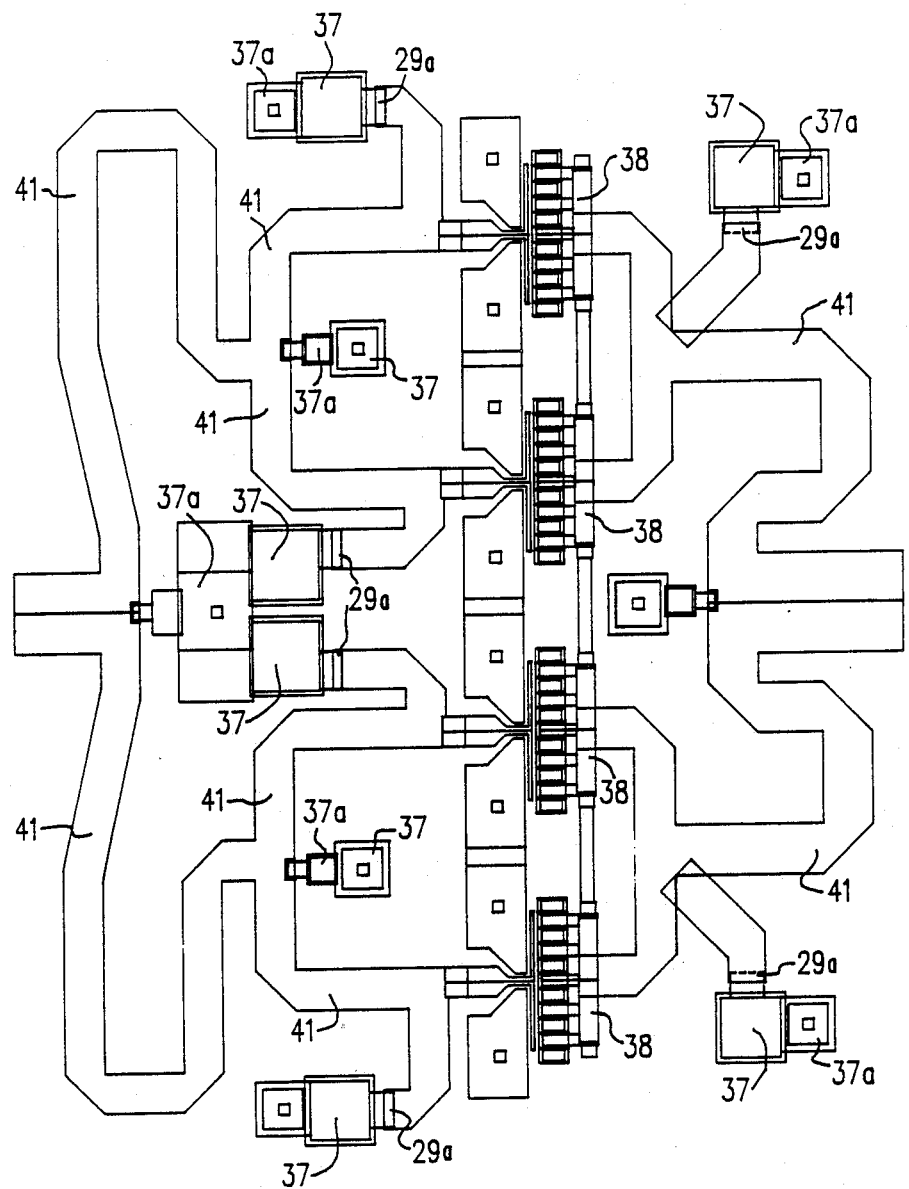
FIG. 7H is a plan view of the output stage amplifier.

FIG. 7H is a plan view of the output stage amplifier 50a, 50b and 50c. Again, only one of the output stage amplifiers 50a, 50b or 50c need be operational for the amplification of the radio frequency signal 3 to one full watt of power. Input and output matching circuitry comprising various capacitors 37, tuning capacitors 37a, and microstrip inductance lines 41 are interconnected as necessary by straight-through switches 29. Four field effect transistors 38, each having 600$\mu$ capability are operable for interconnection by our patented cluster matching technique. The combination of the four 600$\mu$ field effect transistors results in a total value of 2400$\mu$. The output amplifier 50a, 50b, or 50c is equal to two one-half watt amplifiers in parallel. The radio frequency signal 12 will achieve one full watt of power from this output stage amplifier 50a, 50b and 50c.

Figure 7I:
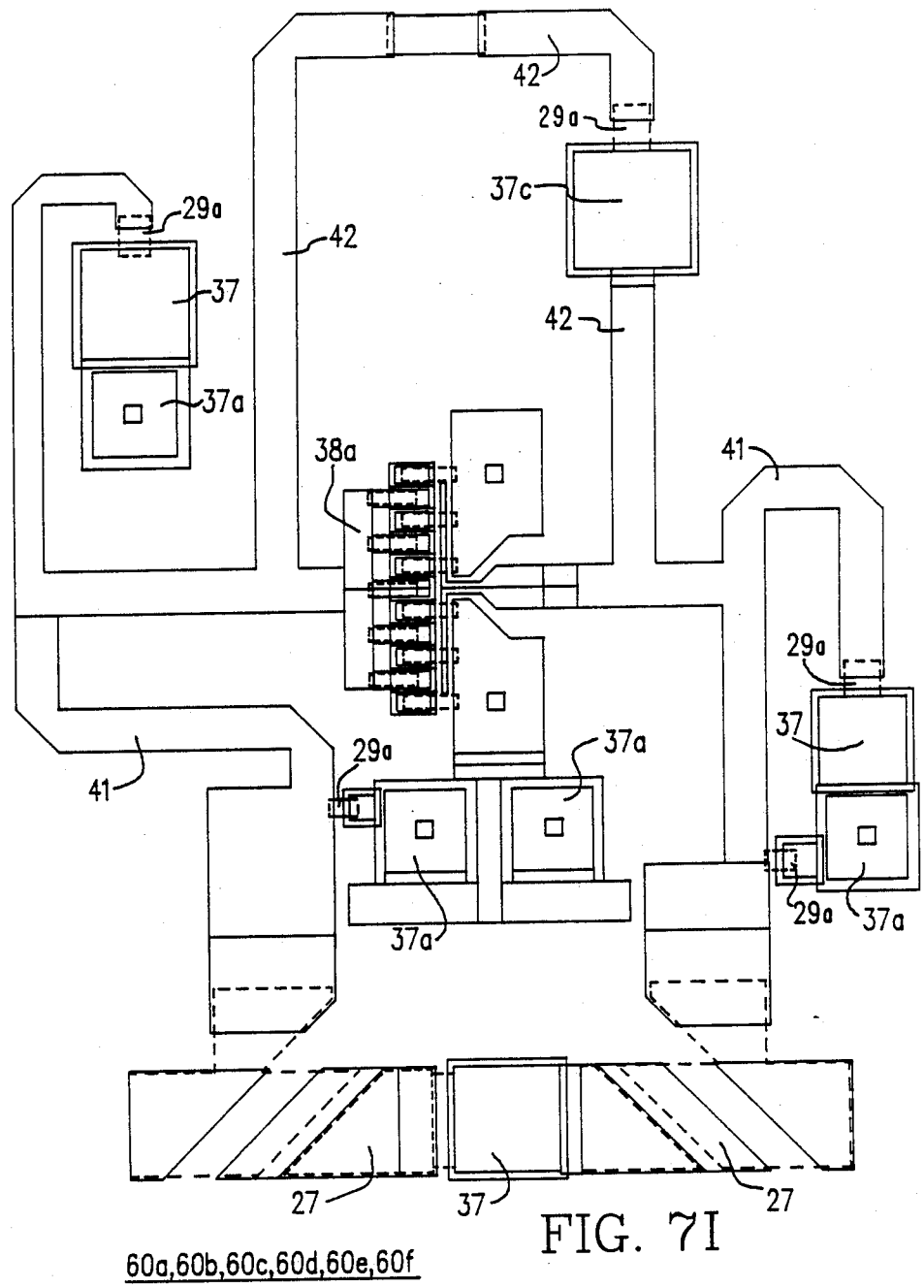
FIG. 7I is a plan view of the low noise amplifier.

FIG. 7I is a plan view of the low noise amplifiers 60a, 60b, 60c, 60d, 60e and 60f. The six low noise amplifiers 60a, 60b, 60c, 60d, 60e and 60f are operable to receive the weak radio frequency signal 12a from the environment outside of the active antenna system 1. Only two of the six low noise amplifiers are required to be operational for amplification of received signal 12a. The low noise amplifiers 60a, 60b, 60c, 60d, 60e and 60f comprise input and output matching circuitry such as microstrip inductances 41, capacitors 37, tuning capacitors 37a and straight line switches 29. A blocking capacitor 37c functions as an integral part of a feedback loop 42. The received signal 12A will feedback into the 600$\mu$ field effect transistor 38a. This field effect transistor 38a is distinct from the previously described field effect transistors 38. The previous field effect transistors 38, had gate lengths of approximately 0.8$\mu$. This gate length of 0.8$\mu$ is most applicable to field effect transistors in the power amplification mode. Field effect transistor 38a of the low noise amplifiers 50a, 60b, 60c, 60d, 60e and 60f have gate lengths of approximately 0.5$\mu$. This gate length of 0.5$\mu$ provides less noise and higher gain for the received amplified signal 12a. In summary, the low noise amplifiers 60a, 60b, 60c, 60d, 60e and 60f are standard feedback amplifiers utilizing field effect transistors 38a, providing one-quarter watt of output power with increased signal gain and reduced noise.

Figure 8:
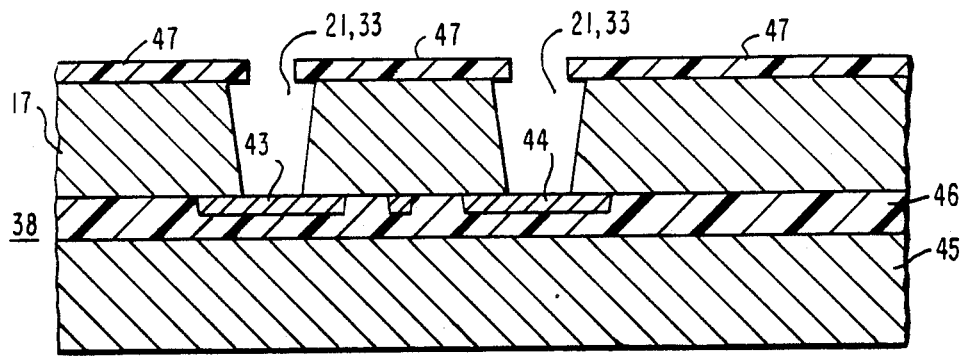
FIG. 8 is a cross sectional of the manner of making the direct current and radio frequency input/output vias within the common semiconductor wafer.

FIG. 8 is a cross section of the manner of making the vias 21, 33 which bring signals from the bottom surface of the semiconductor wafer 17 to the top surface of that same semiconductor wafer 17. Via 21 is the maniforld via which brings a radio frequency signal up through the semiconductor wafer 17 and across the microstrip upon the surface of the transmit-receive cell 7 into the attenuator 15. The antenna via 33 takes the radio frequency output signal 12 of approximately one watt from the second transmit-receive switch through the semiconductor wafer 17 and to the antenna means 14 for transmission outside of the active antenna system 1. A recommended fabrication method for these vias 21, 33 would produce solid electrical connections that could be repaired if improperly formed during transmit-receive cell fabrication. One method of via fabrication would utilize a metal evaporation technique. FIG. 8 shows a wafer of semiconductor material 17, i.e., gallium arsenide. The single wafer 17 would be thinned down to a thickness of approximately 100$\mu$, as used in microwave circuitry. Wafer 17 would be mounted face down on wafer holder 45 using a soft wax 46 as an adhesive. Photoresist layer 47 is then applied to the waver 17. The photoresist 47 is then patterned to define the holes through which the vias 21, 33 would be etched. Vias 21, 33 formed through a gallium arsenide wafer 17 could be formed using wet chemical etching or reactive ion etching. Shown in cross section in FIG. 8 is a single field effect transistor 38, having a source 43 and drain 44.

Figure 8A:
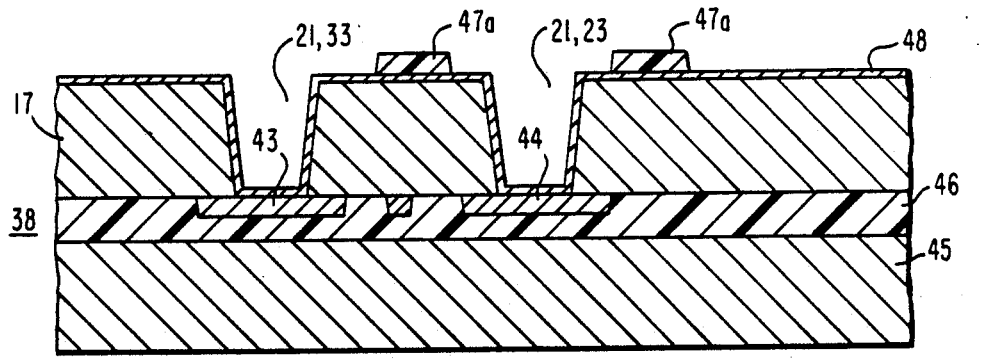
FIG. 8A is a cross sectional of the manner of making the input/output vias with thin-sputtered metalization layer and photo-resist layer.

Next, the photoresist mask 47 is removed and metal is sputtered over the bottom surface of wafer 17 forming a metalization layer 48 as shown in FIG. 8A, a cross section of the manner of making the via connections 21, 33. A second layer of photoresist 47a is patterned about via 21, 33.

Figure 8B:
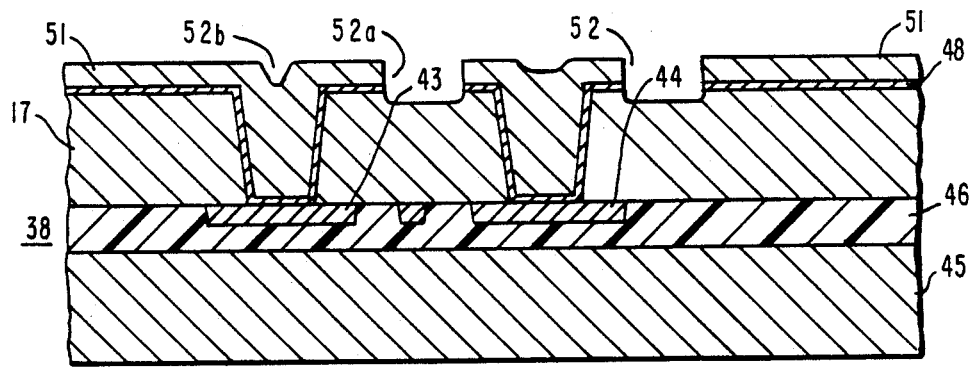
FIG. 8B is a cross section manner of making the plated Au layer upon the thin-sputtered metalization layer.

FIG. 8B is a cross section manner of making demonstrating the removal of the second layer of photoresist 47a after a layer 51 of Au, or other similar highly conductive metal. When the second photoresist layer 47a is removed the thin-sputtered metal layer 48 is exposed. The removal of the second photoresist layer 47a can be performed by etching or ion-milling. The gallium arsenide wafer 17 is then lightly etched to clean the surface and insure its insulating properties. Gaps formed by the removed second layer of photoresist 47a are gaps 52, 52a and 52b.

Figure 8C:
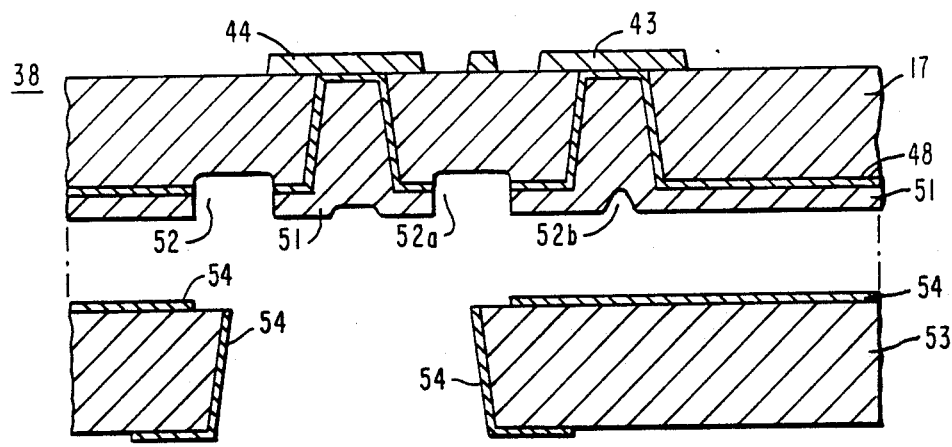
FIG. 8C is a cross section manner of utilizing the shadow mask layer.

FIG. 8C is a cross section method of making wherein the wafer 17 is demounted from wafer holder 45 and wax 46 is removed. The heat sink 53 for wafer 17 comprises a previously prepared wafer of aluminum nitride 53. This heat sink 53 should be of a semi-insulating material, having good thermal conductive properties and an expansion coefficient closely matched to the wafer 17, in this case, gallium arsenide. Close matching between wafer 17 and heat sink 53 will prevent cracking of the wafer 17 during thermal cycling. Solder 54 will serve to attach the aluminum nitride heat sink 53 to the gallium arsenide wafer 17.

Figure 8D:
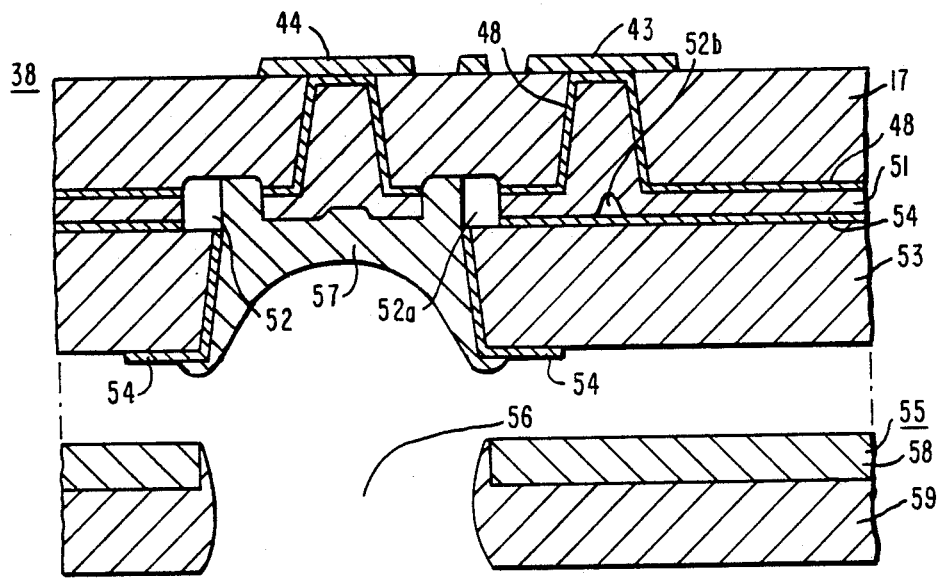
FIG. 8D is a cross section manner of making the evaporated metal interconnect layer.

FIG. 8D is a cross section manner of making wherein a metal shadow mask 55 is used to define the metal 57 a metal evaporated through the orifice 56 in the mask 55. The first layer 58 and second layer 59 of the mask 55 are selectively etched to form orifice 56 which by its size defines the metal evaporation layer 57. Holes 52 and 52a are partially filled by evaporated metal 57. Gap 52b is not filled with evaporated metal 57 and remains open. Additional metal 57 may be evaporated into the area defined by orifice 56 is there is insufficient metalization during initial fabrication to make a good contact.

Figure 8E:
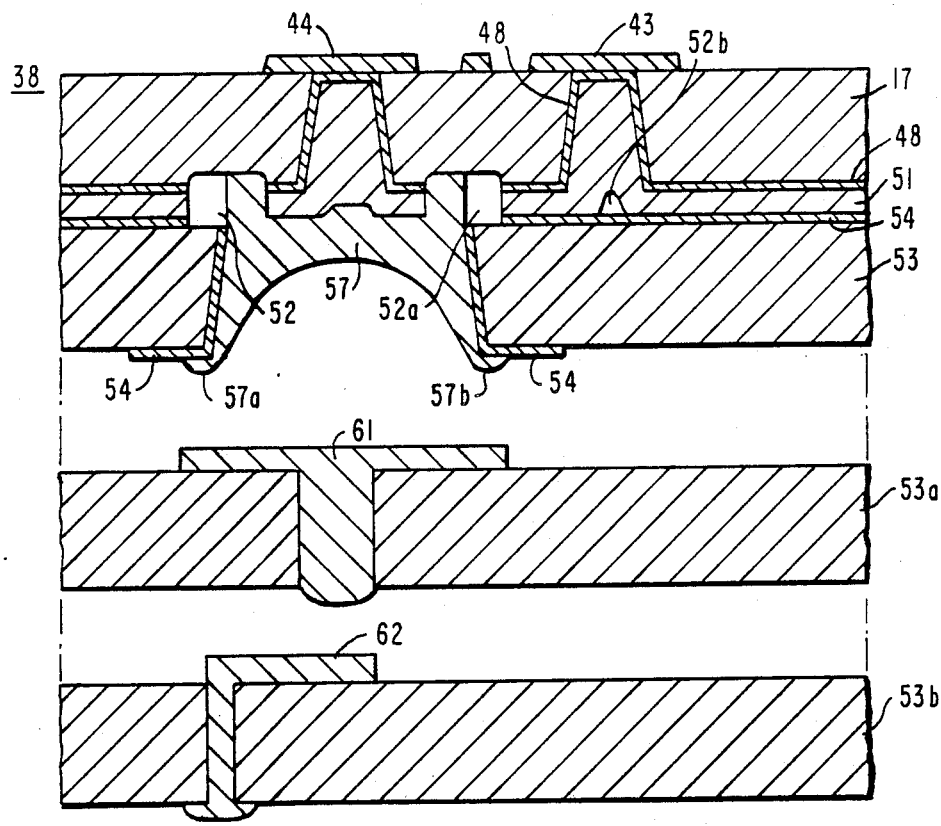
FIG. 8E is a cross section manner of making the completed input/output via in conjunction with the radio frequency and direct current manifold layers.

FIG. 8E is a cross section manner of making of the aluminum nitride layers 53, 53a and 53b. Heat sink layer 53 serves as a structural support and heat dissipation means for the gallium arsenide wafer 17. Layer 53a comprises a second layer of aluminum nitride and a laser drilled, metalized "T" contact 61. The planar top surface of "T" contact 61 contacts contact points 57a and 57b of metal evaporation contact 57. A third layer of aluminum nitride 53b comprises a Duroid, layer 62 of manifold material. During via 21, 33 operation a signal either radio frequency or direct current will enter the surface layer of the transmit-receive cell 7 devices through the metalization contact 57, from manifold 62, through "T" contact 61. This technique while not the exclusive method to manufacture vias 21, 33 will produce a high yield of successful contacts and facilitate re-metal evaporation of area 57 to increaseor build up the contact.

FIG. 9 is a plan view of the mitered mechanical switch 27 which facilitates the interconnection of selected electronic devices on the surface of the transmit-receive cell 7. Mitered mechanical switch 27 comprises three layers of distinct metalization, layers 27a, 27b and 27c.

FIG. 9A is a plan view of first metalization layer 27a. First metalization layer 27a comprises three distinct portions; 27a1, a rectangular piece with a beveled left lower corner; 27a2 the left half portion of a bisected rectangle; and 27a3, the right half portion of a bisected rectangle.

FIG. 9B is a plan view of the second metalization layer 27b. Second metalization layer 27b comprises three distinct portions; 27b1, a rectangular piece substantially smaller than 27a1; 27b2 the left half portion of a bisected rectangle, also slightly smaller in size than 27a2; and 27b3 the right half portion of a bisected rectangle, again smaller in physical size than 27a3. During fabrication of the transmit-receive cell 7, metalization layer 27b will be layered upon layer 27a.

FIG. 9C is a plan view of the third metalization layer 27c. Third metalization layer 27c comprises three distinct portions; 27c1 a rectangular piece significantly smaller than 27b1; 27c2 the left half portion of a bisected rectangle, significantly smaller than 27b2; and a keystone shaped portion 27c3. This 27c3 keystone portion is significantly larger than 27b3. During fabrication of the mitered switches 27 on the transmit-receive cell 7, metalization layer 27c will be layered upon layer 27b.

FIG. 9D is a left side view of mitered switch 27 as shown in FIG. 9. An air gap or air path 28 can be seen formed between layers 27c3 and 27a1. When this air path or gap 28 exists the switch is open and no electrical or radio frequency energy will pass through mitered switch 27.

FIG. 9E is a right side view of mitered switch 27 as shown in FIG. 9. An air path or air gap 28 is found between metalization layers 27c3 and 27a1. If this switch 27 is open this air path 28 will be open.

FIG. 9, in summary, is a plan view of mechanical mitered switch 27. During transmit-receive cell 7 fabrication and test various redundant electronic devices will be found operative or inoperative. Selected electronic devices may be permanently interconnected together forming transmit or receive circuits using the mechanical mitered switch 27. A switch 27 would be placed at the input and the output of each device. To close switch 27, to interconnect a specific device, portion 27c3 of metalization layer 27c must be actuated using pressure or vibration. Once layer 27c3 contacts layer 27a1 the switch will be closed forming a right angle switch. If a particular device is to be bypassed in the circuit, portion 27c3 must contact layer 27a2—only the lower "head" of the keystone 27c3 is contacted to 27a2 creating a straight-through electrical line connection between 27c3 and 27a2.

Figure 10:
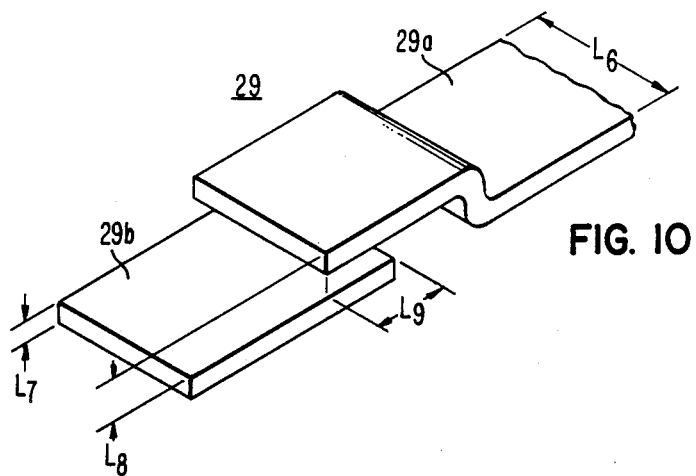
FIG. 10 is an isometric of a straight through mechanical switch in the open position.

FIG. 10 is an isometric view of a low capacitance configurable or "straight-through" switch. Such a switch interconnects the various field effect transistors or capacitors within the individual electronic devices. This switch, which comprises two portions, 29a and 29b, is operable to be cold vibration welded into a closed position. FIG. 10 shows the low capacitance configurable switch in the open position. Portion 19a could be some type of gold alloy like AuTi. Portion 29a would have a width of $L_6$ or approximately, 0.005 inches (0.013 cm). Portion 29b would be layered of Au only, and having a width $L_7$ of approximately 1.5μ. The gap between portion 29a and portion 29b when the switch 29 is in the open position would be approximately 5μ or dimension $L_8$. When in the open position, switch 29 will have portion 29a overhanding portion 29b by approximately 0.0025 inches (0.006 cm).

Figure 10A:
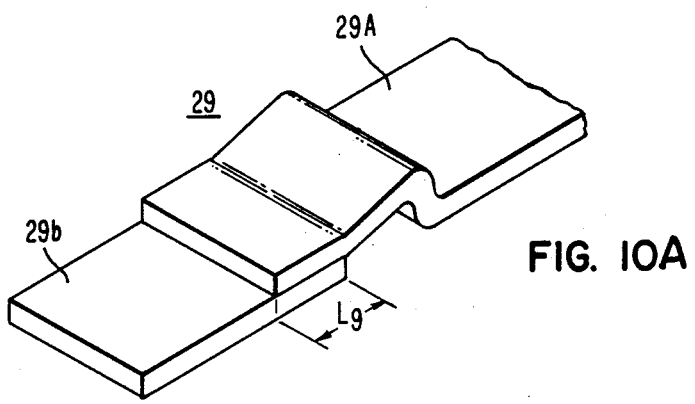
FIG. 10A is an isometric of a straight through mechanical switch in the closed position.

FIG. 10a is an isometric view of the low capacitance switch 29 in the closed position. When switch 29 is subjected to vibration at room temperature and permanent cold weld is formed between portion 29a and 29b. A portion of 29b of length $L_9$ or approximately 0.0025 inches (0.006 cm). This low capacitance configurable switch is taught by the United States Patent to Nathanson et al., assignee Westinghouse Electric Corporation, U.S. Pat. No. 3,681,134.

Figure 11:
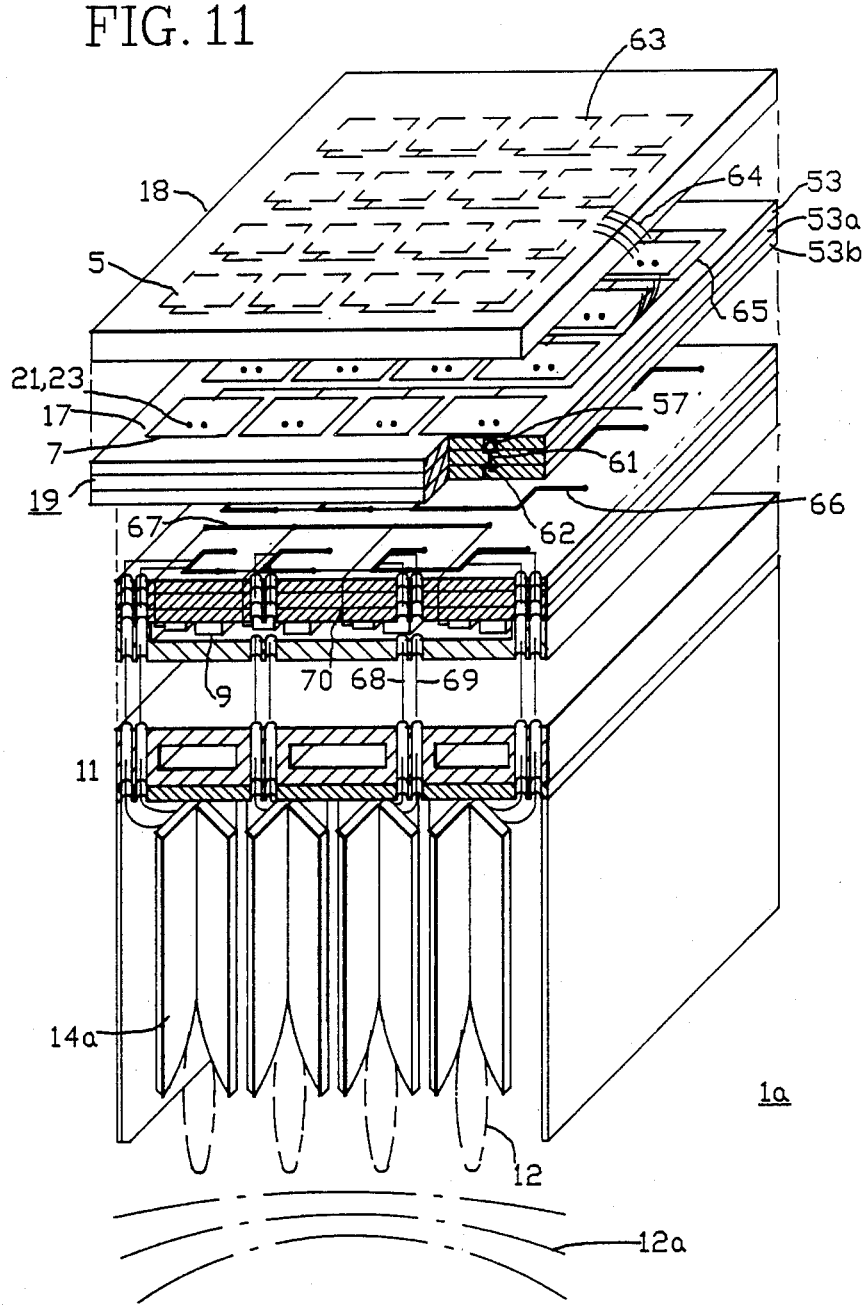
FIG. 11 is an exploded view of the phased array active antenna system, narrow band electronic countermeasures embodiment.

FIG. 11 is an exploded view of an active, phased array antenna system having electronic countermeasure applications, 1a. Logic control devices 5 rest upon the underside of sealed lid 18. Sealed lid 18 is operable to fully enclose the array of transmit-receive cells 7 all formed, uncut upon the single wafer of gallium arsenide 17. The logic control devices 5 feed their decoded voltages from the central processing unit 2 through lines 63 to strap 64. Strap 64 interconnects the voltages from the logic control devices 5 to the lines 65 between the individual transmit-receive cells 7. The wafer 17 comprising the array of transmit-receive cells 7 rests upon a multilayer aluminum nitride support layer 17. The multilayer support layer 19 comprises aluminum heat sink 53 and sublayers 53a and 53b. Input and output vias 21, 33 for the radio frequency signal or direct current energy are cut into the common wafer 17 for each individual transmit-receive cell 7. Electrical interconnection between the surface of wafer 17 and the underlying RF manifold 67 and direct current manifold 66 is achieved through the use of multistage metal evaporated vias 57, 61 and 62. Radio frequency signals 12 transmitted from this electronic countermeasure transmit-receive cell 7 would exit the RF manifold 67 by hardwire 68 which is connected to one horn of broadband antenna means 14a. A receive radio frequency signal, 12A would enter horn 14a and pass into the antenna via by hardwire 69. A broadband application would be in the range of 2 GHz to 20 GHz. A signal 12A in this range would be received by the horn antenna means 14a. Receipt of such a signal 12a would indicate that an enemy radar system was in the environment outside of the active antenna system 1A. The received signal 12A would pass up through the various support structures of system 1A into the RF manifold 67, up through via 57 by way of contacts 61 and 62. The input signal 12A would enter the surface of the transmit-receive cell 7 where the receive circuit would low noise amplify, attenuate, phase shift, analog or digitally dependent upon the logic control means 5 as directed by the central processing means 2. The received signal 12a would then pass into the manifold 11 and into the central processing means 2. During the transmission mode of an amplified radio frequency signal 12, heat is produced by the output stage amplifiers on the transmit-receive cell 7. This heat is effectively dissipated by the heat dissipation means 11. The active antenna ECM (electronic counter measures) system 1A can operate in the pulsed mode by the storage of electrical energy in the capacitative storage means 9. A transmitted signal 12 in this system will be transmitted, cross polarized from the enemy signal 12a thereby effectively jamming his radio frequency transmissions 12a.

Figure 11A:
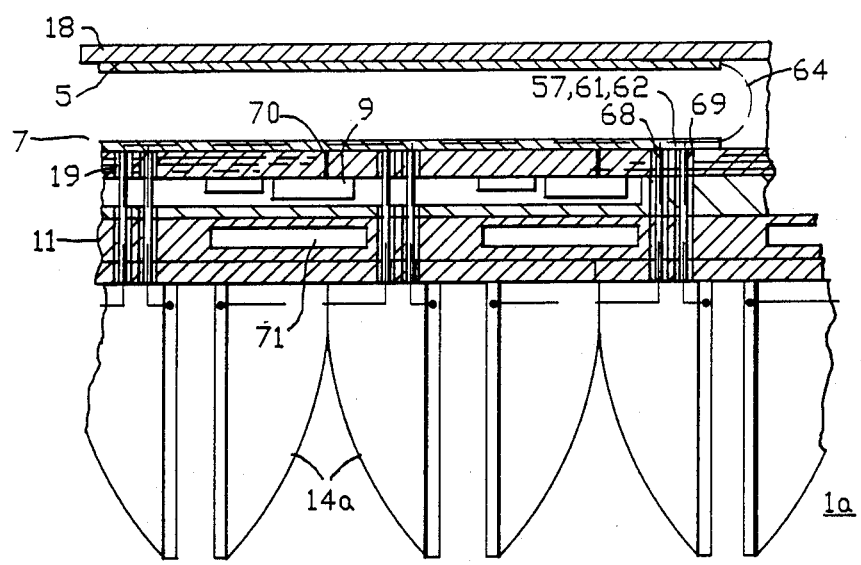
FIG. 11A is an enlargement of a portion of FIG. 11, phased array active antenna system, narrow band electronic countermeasures embodiment.

FIG. 11A is a cross section enlargement of the ECM active antenna system 1A. Sealed lid 18 has logic control means 5 embedded upon it. Trap 64 carries the decoded voltages from the logic control means to the transmit-receive cell 7 which rests upon AlN layer 19. Upon the underside of AlN layer 19, a capacitative storage means 9 stores electrical energy for pulsed operation. Electrical connection 7 transmits this stored energy from storage means 9 to the individual transmit-receive cell 7. Heat dissipation means 11 with a multiplicity of orifices 71 dissipates heat buildup away from the transmit-receive cell 7. The antenna means 14a comprises dual horns which are operable to transmit signals polarized from the signals received. Received signals travel from one horn of antenna 14a in line 68. Transmitted signals pass through line 69 to the second horn of antenna 14A.

Figure 12:
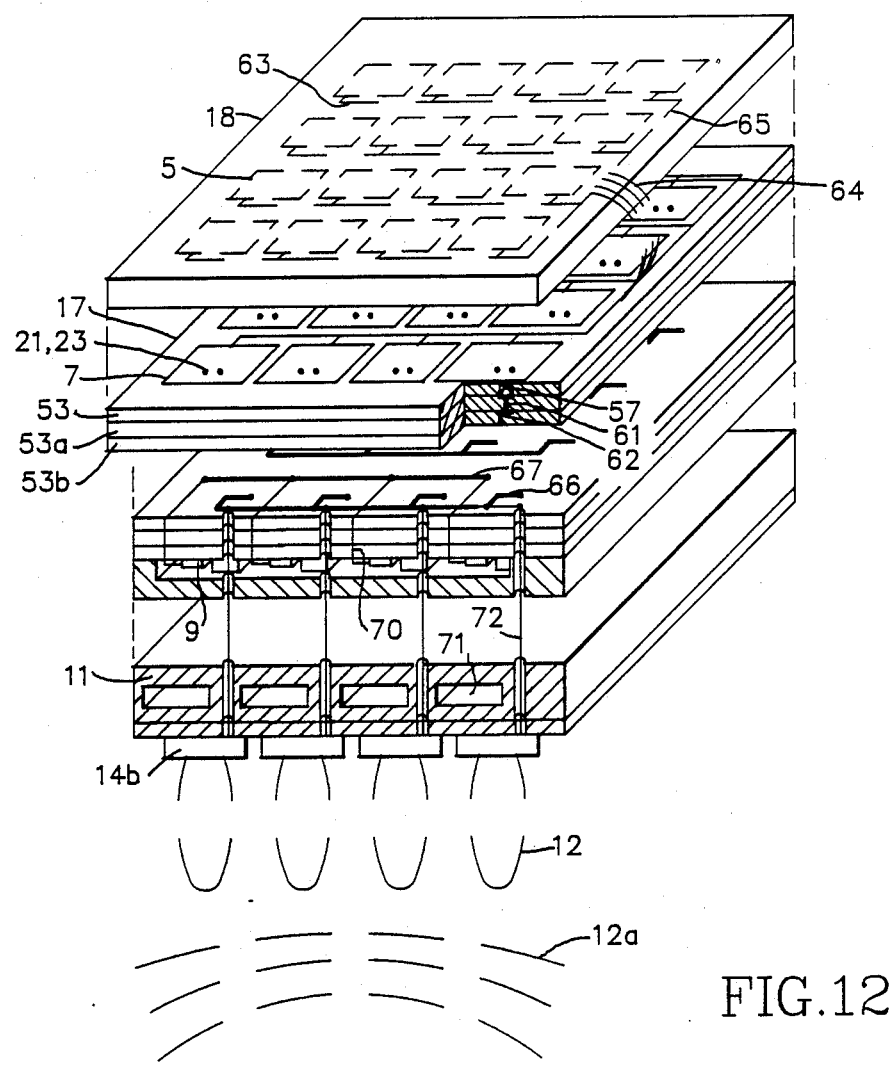
FIG. 12 is an exploded view of the phased array active antenna system, broad band radar embodiment.

FIG. 12 is an exploded view of a radar application for the active antenna phased array system 1B. This narrow band application would broadcast in a range of approximately 9.8 GHz to 10.2 GHz. A patch antenna means 14B would transmit 12 or receive the reflected signal 12a. A sealed cover means 18 having a multiplicity of logic control means 5 embedded in its surface would fully enclose the gallium arsenide wafer 17 with its multiplicity of individual transmit-receive cells 7. Each transmit-receive cell is operable to, utilizing one logic control means 5 and one antenna means 14b transmit or receive a radio frequency signal of predetermined phase and frequency. Logic control signals, in the form of voltages are sent by common lines 63 through strap 64 to wafer surface lines 65. These logic control voltages direct the individual phase shifting devices on the transmit-receive cell 7. Each transmit-receive cell 7 has a multiplicity of electronic devices upon its surface, which are fully redundant and operable to be selectively, permanently interconnected to form distinct transmit or receive circuits. The wafer 17 is supported by a multilayer AlN support structure 19. This structure 19 further comprises 53, 53a and 53b. Vias 21, 33 formed of elements 57, 61 and 62 interconnect the surface of the wafer 17 and the embedded radio frequency 67 and direct current manifolds 66. Direct current energy is stored in capacitative storage means 9, and supplied to the cells 57 during pulsed signal transmission. Heat generated by the output amplifiers on the transmit-receive cell 7, is dissipated by heat dissipation means 11 through orifices 71. A transmitted signal 12 will pass from the RF manifold 67 by line 72 to antenna means 14b. The received, weak reflected signal 12a will pass on the same line 72 to the same RF manifold 67. Received signal 12a will be passed to the surface of the transmit-receive cell 7 by way of vias 21, 33 and to the central processor 2 for analysis.

Figure 12A:
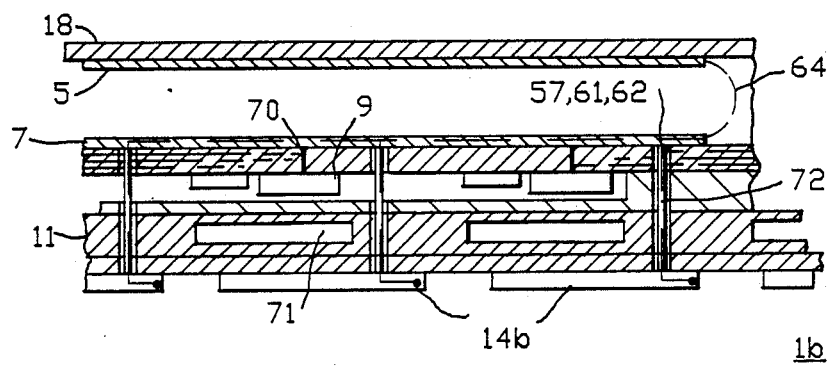
FIG. 12A is an enlargement of a portion of FIG. 12, phased array active antenna system, broad and radar embodiment.

FIG. 12A is a cross section enlargement of the radar, narrow band, active antenna system 1a. Sealed lid 18 has logic control means 5 embedded upon it. Strap 64 carries the decoded voltages from the logic control means to the transmit-receive cell 7 which rests upon AlN layer 19. Upon the underside of AlN layer 19, a capacitative storage means 9 stores electrical energy for pulsed operation. Electrical connection 70 transmits this stored energy from storage means 9 to the individual transmit-receive cell 7. Heat dissipation means 11 with a multiplicity of orifices 71 dissipates heat buildup away from the transmit-receive cell 7. The antenna means 14B comprises a patch antenna or flat circular disk, off center actuated which is operable to transmit signals or receive signals in the narrow band range. Received signals travel from the patch antenna 14B in line 72 to the cell 7. Transmitted signals pass through line 72 to the same patch antenna 14B and into the environment outside of the system 1B.

Numerous variations may be made in the above-described combination and different embodiments of this invention may be made without departing from the spirit thereof. Therefore, it is intended that all matter contained in the foregoing description and the accompanying drawings shall be interpreted as illustrative and not in the limiting sense.

We claim:

1. A metal evaporation method of producing vias within a semiconductor substrate, said vias operable to facilitate the transmission of electrical signals from the bottom surface of said semiconductor substrate to the top surface of said semiconductor substrate, said method comprising:

thinning of a wafer of semiconductor material, said wafer having a top and a bottom surface to a thickness of approximately 100 microns;

mounting of said thinned wafer of semiconductor material face down upon a wafer holder such that said top surface of said wafer is mounted upon said wafer holder using an adhesive means;

application of a first layer of photoresist material upon said bottom surface of said wafer;

patterning of said first layer of photoresist, said patterning operable to define the holes through said semiconductor substrate for said vias to be etched;

formation of said vias within said semiconductor substrate utilizing an etching technique;

selective removal of said first layer of photoresist material from said bottom surface of said wafer;

sputtering of metal over said bottom surface of said semiconductor wafer, thereby forming a metallization layer upon said bottom surface of said semiconductor wafer;

application of a second layer of photoresist material upon said metallization layer upon said bottom surface of said semiconductor wafer, said second layer of photoresist selectively patterned about said vias;

application of a thin layer of a highly conductive metal upon the surface of said second layer of photoresist;

selective removal of said second layer of photoresist material such that said sputtered metal layer is selectively exposed;

light etching of said semiconductor wafer to insure its insulating properties and to clean said bottom surface;

demounting of said wafer from said wafer holder means;

removal of said adhesive means from said top surface of said wafer;

application of a heat sink means, said heat sink means comprising semi-insulating material having good thermal conductive properties and an expansion coefficient closely matched to said wafer, said heat sink means applied to said bottom side of said wafer;

placement of a metal shadow mask upon said wafer such that an orifice in said mask is placed directly over said via; and evaporation of metal into the orifice in said metal shadow mask and said via, said evaporation of metal operable to form solid electrical connections through said semiconductor substrate, said solid electrical connections operable to interconnect said top and said bottom surfaces, electrically.

* * * * *